US012748529B2

(12) United States Patent
Honda et al.

(10) Patent No.: US 12,748,529 B2
(45) Date of Patent: Sep. 29, 2026

(54) MEMORY SYSTEM, HOST DEVICE AND METHOD FOR CONTROLLING GARBAGE COLLECTION OF ZONE INCLUDING NONVOLATILE MEMORY

(71) Applicant: Kioxia Corporation, Tokyo (JP)

(72) Inventors: Keigo Honda, Yokohama Kanagawa (JP); Masayuki Shibaoka, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 66 days.

(21) Appl. No.: 18/829,797

(22) Filed: Sep. 10, 2024

(65) Prior Publication Data

US 2025/0199685 A1 Jun. 19, 2025

(30) Foreign Application Priority Data

Dec. 18, 2023 (JP) ................................ 2023-213007

(51) Int. Cl.
*G06F 3/06* (2006.01)

(52) U.S. Cl.
CPC .......... *G06F 3/0611* (2013.01); *G06F 3/0659* (2013.01); *G06F 3/0679* (2013.01)

(58) Field of Classification Search
CPC ...... G06F 3/0611; G06F 3/064; G06F 3/0644; G06F 3/0652; G06F 3/0659; G06F 3/0679
See application file for complete search history.

(56) References Cited

U.S. PATENT DOCUMENTS

| | | | | |
|---|---|---|---|---|
| 10,417,190 | B1 * | 9/2019 | Donlan | G06F 16/128 |
| 2012/0203951 | A1 | 8/2012 | Wood | |
| 2013/0339587 | A1 * | 12/2013 | Asnaashari | G06F 11/20 711/103 |
| 2014/0215129 | A1 * | 7/2014 | Kuzmin | G06F 12/0246 711/103 |

(Continued)

FOREIGN PATENT DOCUMENTS

| | | |
|---|---|---|
| JP | 2015-079495 A | 4/2015 |
| JP | 2020-046963 A | 3/2020 |

(Continued)

OTHER PUBLICATIONS

Changman Lee et al., "F2FS: A New File System for Flash Storage", Proceedings of the 13th USENIX Conference on File and Storage Technologies (FAST '15), Feb. 16-19, 2015, pp. 273-286, https://www.usenix.org/system/files/conference/fast15/fast15-paper-lee.pdf (15 pages).

(Continued)

*Primary Examiner* — Larry T Mackall
(74) *Attorney, Agent, or Firm* — Foley & Lardner LLP

(57) ABSTRACT

According to one embodiment, a controller of the memory system manages a plurality of zones using first information indicating (i) a correspondence between the zones and storage areas of a nonvolatile memory and (ii) a status of each of the zones. The status includes a first status indicating that data is written over an entire logical address range corresponding to a zone and a second status indicating that a zone is reset. In response to receiving a first command from a host device, the controller transmits to the host device a first list including information indicating a zone which is to be garbage collected. The zone is determined based on the first information.

18 Claims, 13 Drawing Sheets

(56) References Cited

U.S. PATENT DOCUMENTS

| | | | | |
|---|---|---|---|---|
| 2017/0371572 | A1* | 12/2017 | Lee | G06F 3/064 |
| 2020/0089430 | A1 | 3/2020 | Kanno | |
| 2021/0223994 | A1* | 7/2021 | Kanno | G06F 3/0679 |
| 2022/0066992 | A1 | 3/2022 | Duval | |
| 2022/0100390 | A1 | 3/2022 | Bjorling et al. | |
| 2022/0318133 | A1 | 10/2022 | Hsu et al. | |
| 2022/0405008 | A1 | 12/2022 | Masuo | |

FOREIGN PATENT DOCUMENTS

| | | | |
|---|---|---|---|
| JP | 2023-002294 | A | 1/2023 |
| JP | 2023-514307 | A | 4/2023 |
| WO | WO-2021/168020 | A1 | 8/2021 |

OTHER PUBLICATIONS

Matias Bjørling et al., "ZNS: Avoiding the Block Interface Tax for Flash-based SSDs", Proceedings of the 2021 USENIX Annual Technical Conference, Jul. 14-16, 2021, pp. 689-703, https://www.usenix.org/system/files/atc21-bjorling.pdf (16 pages).

* cited by examiner

Zone status management table

| Superblock | Zone | Status of Zone |
|---|---|---|
| SB1 | ZN1 | Empty(Reset) |
| SB1 | ZN2 | Empty(Reset) |
| SB1 | ZN3 | Full |
| SB1 | ZN4 | Empty(Reset) |
| SB2 | ZN5 | Full |
| SB2 | ZN6 | Full |

MEMORY SYSTEM, HOST DEVICE AND METHOD FOR CONTROLLING GARBAGE COLLECTION OF ZONE INCLUDING NONVOLATILE MEMORY

CROSS-REFERENCE TO RELATED APPLICATIONS

This application is based upon and claims the benefit of priority from Japanese Patent Application No. 2023-213007, filed Dec. 18, 2023, the entire contents of which are incorporated herein by reference.

FIELD

Embodiments described herein relate generally to a memory system, a host device and a method for controlling nonvolatile memory.

BACKGROUND

In recent years, memory systems that include nonvolatile memories have become widely used. In an information processing system that includes the memory system and a host device to accesses the memory system, data is not directly overwritten on a nonvolatile memory when the data is updated. Instead, the information processing system writes new data to a storage location of the nonvolatile memory which is different from a storage location of the nonvolatile memory where old data is written. Then, the information processing system updates mapping such that the storage location of the data is changed from the storage location of the old data to the storage location of the new data. In this manner, the information processing system performs updating of data.

Continuing the above data updating may result in fragmentation of data in the memory system. This causes the storage area of the memory system to store invalid data that is not accessed by the host device. That is, the storage area of the memory system is wasted. It is thus necessary to perform garbage collection on the data stored in the memory system. However, the garbage collection performed in the memory system causes some problems. The problems include, for example, deterioration of write amplification (WAF) in the memory system and deterioration of quality of service (Qos) due to overlapping of host device access and the garbage collection.

Therefore, there is a need for a technology capable of performing the garbage collection with efficiency.

DETAILED DESCRIPTION

Various embodiments will be described hereinafter with reference to the accompanying drawings.

In general, according to one embodiment, a memory system is connectable to a host device. The memory system comprises a nonvolatile memory and a controller. The nonvolatile memory includes a plurality of storage areas. The controller controls access including writing and reading of data to and from the nonvolatile memory, based on a command received from the host device. The controller manages a plurality of zones using first information indicating (i) a correspondence between the plurality of zones and the plurality of storage areas and (ii) a status of each of the plurality of zones. Each of the plurality of zones corresponds to a logical address range within a logical address space that is used in an access from the host device to the memory system. The status of one of the plurality of zones includes a first status and a second status. The first status indicates that data is written over an entire logical address range corresponding to the one of the plurality of zones. The second status indicates that the one of the plurality of zones is reset. In response to receiving a first command from the host device, the first command requesting a zone which is to be garbage collected, the controller transmits to the host device a first list. The first list includes information indicating a zone which is to be garbage collected. The zone which is to be garbage collected is determined based on the first information.

Figure 1:
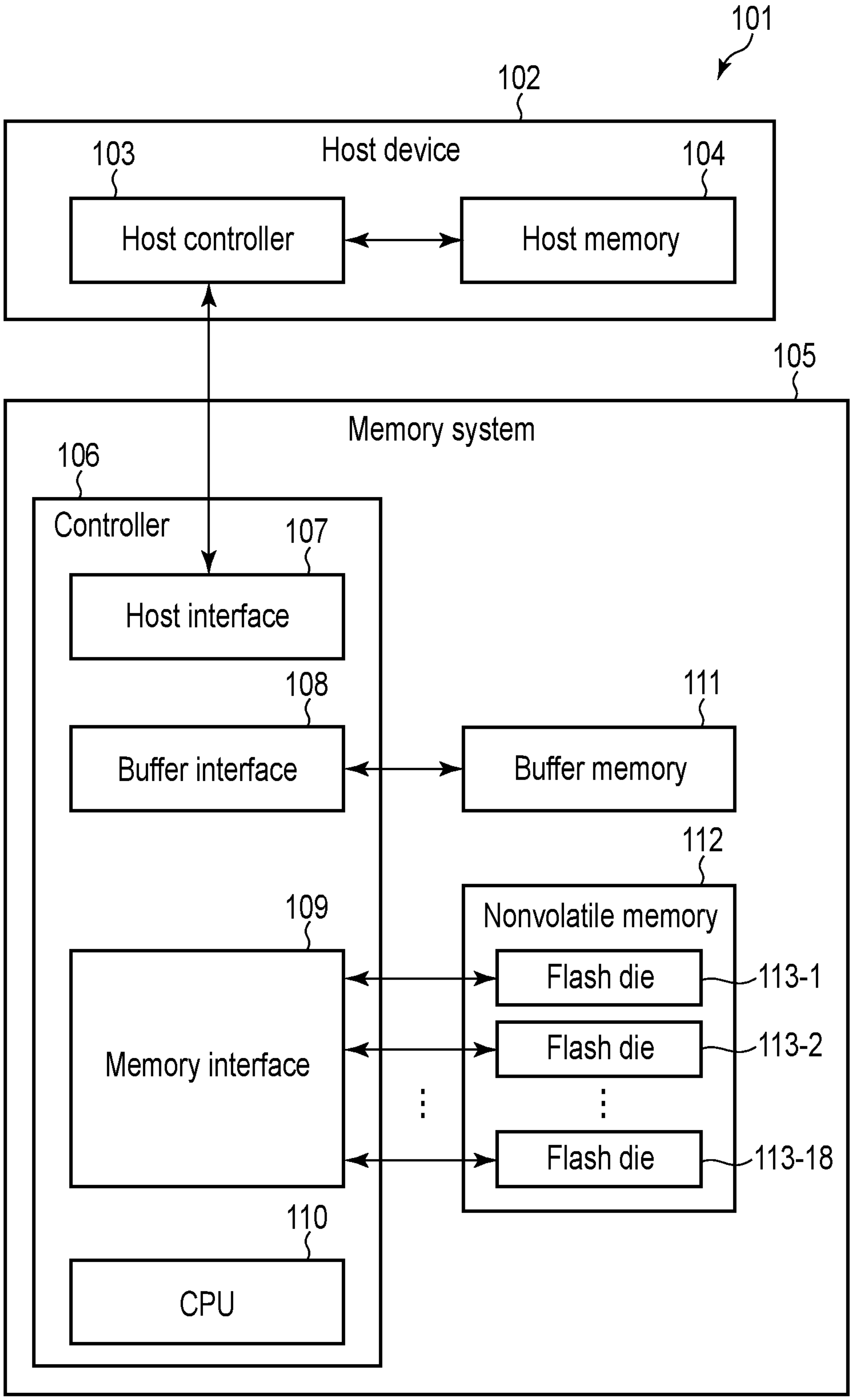
FIG. 1 is a block diagram illustrating an example of a configuration of an information processing system that includes a host device and a memory system according to an embodiment.

FIG. 1 is a block diagram illustrating an example of a configuration of an information processing system 101 that includes a host device (host) 102 and a memory system 105 according to an embodiment. The host device 102 and the memory system 105 may be connected communicatively via a bus, for example.

The host device 102 is an information processing device. The host device 102 is, for example, a personal computer, a server computer, or a mobile device. The host device 102 accesses the memory system 105. Specifically, the host device 102 transmits commands to the memory system 105 to control the memory system 105. The commands include, for example, input/output (I/O) commands and management commands. The I/O commands include a command for writing data to a nonvolatile memory 112 in the memory system 105 or reading data out of the nonvolatile memory 112. The I/O commands include, for example, a write command or a read command. The management commands include a command for the host device 102 to control zones in the memory system 105. Details of the zones and management commands will be described later.

The memory system 105 is a storage device connectable to the host device 102. The memory system 105 includes, for example, a universal flash storage (UFS) device or a solid state drive (SSD). The memory system 105 includes the nonvolatile memory 112. The memory system 105 may be used, for example, as an external storage device for the host device 102. The memory system 105 may be a built-in use flash memory or an SSD that performs communications with the host device 102 in conformity with the UFS standard, the eMMC standard, the NVMe™ standard, or the like.

When at least part of a storage area of the memory system 105 is controlled using a control method called a zoned storage, the information processing system 101 including the host device 102 and memory system 105 manages a plurality of zones. The memory system 105 associates one storage area in the memory system 105 with one of the zones. Each of the zones corresponds to part of the logical address range in the logical address space for use in accessing the memory system 105 from the host device 102. That is, the zones are a set of consecutive logical addresses. The logical addresses are addresses each logically specifying a storage location in the logical address space in the memory system 105. As the logical address, a logical block address (LBA) or the like can be used.

When a file system such as a flash-friendly file system (F2FS), a database of a log structure merged (LSM) tree, or the like is used, the hierarchized data is managed by the host. The host then manages an update of data by changing a data pointer from an address before the update to an address after the update. Then, the host performs garbage collection to move new data among the hierarchized data and deletes the old data among the hierarchized data. If, however, access from the host to the memory system is executed only by the LBA, it is difficult to manage appropriately hierarchized data in the memory system, and garbage collection in a management of the memory system as well as in a management of the host is required. Therefore, a control technique capable of eliminating the need for garbage collection in the management of the memory system, such as zoned namespace (ZNS) and flexible data placement (FDP), have been proposed. For example, in the ZNS, a zone corresponding to a logical address range is managed, and the memory system allows only sequential write within the zone. The memory system allocates a storage area to the zone. Then, based on an identifier specifying a zone, which is included in a write command received from the host, the memory system determines a storage area corresponding to the specified zone as a storage area of a write destination. Thus, data associated with write commands specifying the same zone are stored in the same storage area. Among the data hierarchized by the host, data of the same hierarchy are managed as data of the same zone and thus stored in the same storage area in the memory system. Since, therefore, the garbage collection in the management of the memory system can be reduced, the WAF of the memory system can be decreased.

A zone is caused to transition to one of a plurality of statuses based on the state of the zone. The statuses include full, empty, open, and the like.

The full is a state in which data is written to the entire logical address range corresponding to the zone. That is, the zone of the full is a zone in which data write is started from the initial logical address of the zone and executed continuously to the end logical address of the zone. A zone in which data write is completed is caused to transition to the zone of the full. The zone of the full stores at least valid data. The valid data is data that is likely to be accessed by the host device 102. Data that is not likely to be accessed by the host device 102 is referred to as invalid data.

The empty is the state of a zone which is reset. The zone of the empty is a zone that stores only data that is not likely to be accessed by the host device 102, that is, invalid data. The zone of the empty is a zone in which data can be written from the initial logical address of the zone.

The open is a state in which writing of data is in progress. When specifying a certain zone as a write destination, the host device 102 causes this zone to transition to the open. When a new zone is to be opened, the host device 102 selects any zone from the zones of the empty and causes the selected zone to transition to the open.

Next, a configuration of the host device 102 will be described. The host device 102 includes a host controller 103 and a host memory 104.

The host controller 103 is, for example, a central processing unit (CPU). The host controller 103 is also referred to as a processor. The host controller 103 may be configured as a system-on-a-chip (SoC). The host controller 103 may include one or more processors. The host controller 103 executes software (host software) loaded into the host memory 104 from the memory system 105 or another storage device connected to the host device 102. The host software includes, for example, an operating system, a file system, and an application program. The host controller 103 executes a file system that conforms to F2FS, for example.

The host controller 103 manages whether or not data stored in each zone is valid data. That is, the host controller 103 manages the correspondence between information specifying data and information indicating the logical address in the zone in the host device 102. For the information indicating the logical address in the zone managed by the host controller 103, for example, a segment is used. Data stored in a segment associated with the information specifying data is valid data. On the other hand, data stored in a segment that is not associated with the information specifying data is invalid data. The host controller 103 may use metadata as data for managing the correspondence between the information specifying data and the segment. Details of the metadata will be described later.

The host memory 104 is, for example, a volatile memory. The host memory 104 is also referred to as a main memory or a system memory. The host memory 104 is, for example, a dynamic random access memory (DRAM). Part of the storage area of the host memory 104 is used, for example, as a work area of the host controller 103.

Next, a configuration of the memory system 105 will be described. The memory system 105 includes a controller 106, a buffer memory 111 and a nonvolatile memory 112.

The controller 106 is a circuit that functions as a memory controller. The controller 106 is a semiconductor device such as a system-on-a-chip (SoC). The controller 106 is electrically connected to the nonvolatile memory 112. The controller 106 performs a write process or a read process based on each of the I/O commands received from the host device 102. The write process is a process for writing data to the nonvolatile memory 112. The read process is a process for reading data from the nonvolatile memory 112. As the standard of an interface that electrically connects the controller 106 and the nonvolatile memory 112, for example, a Toggle interface or an open NAND flash interface (ONFI) is used. The controller 106 may also be electrically connected to the buffer memory 111. The controller 106 writes data to the buffer memory 111 and reads data from the buffer memory 111. The function of each components of the controller 106 may be implemented by dedicated hardware, a processor that executes programs, or a combination of the dedicated hardware and the processor.

The buffer memory 111 is, for example, a volatile memory. The buffer memory 111 is, for example, a DRAM or a static RAM (SRAM). The buffer memory 111 is used, for example, as a work area of the controller 106. A part of the storage area of the buffer memory 111 is used as a write buffer for temporarily storing data received from the host device 102. Another part of the storage area of the buffer memory 111 is used as a read buffer for temporarily storing data read from the nonvolatile memory 112. Still another part of the storage area of the buffer memory 111 may be used to temporarily store tables and lists for management of the memory system 105. The tables and lists used for the management of the memory system 105 include, for example, a lookup table (LUT), a zone status management table and a garbage collection (GC) recommended zone list. Details of the lookup table, zone status management table and GC recommended zone list will be described later.

The nonvolatile memory 112 is a semiconductor memory device. The nonvolatile memory 112 is implemented by a NAND flash memory, for example. Hereinafter, a description will be given on the assumption that the nonvolatile memory 112 is implemented as a NAND flash memory. The nonvolatile memory 112 is, for example, a flash memory including a plurality of memory cells of a two-dimensional structure or a three-dimensional structure. The nonvolatile memory 112 includes a plurality of blocks. Each of the blocks is a unit of a data erase operation. The NAND flash memory does not overwrite data directly in a storage area to which data is written once. In the NAND flash memory, after the data erase operation is performed, new data is written again to the storage area to which data is written once.

The data written to the nonvolatile memory 112 is managed by mapping between a physical address indicating the storage location of the nonvolatile memory 112 and a logical address for use in access by the host device 102. The mapping is managed by the controller 106 using a lookup table. If data is written to the nonvolatile memory 112 based on a write command received from the host device 102, mapping between a physical address indicating the storage location to which the data is written and a logical address specified by the write command is recorded in the lookup table. Then, if new data is written to another storage location of the nonvolatile memory 112 based on a new write command specifying the same logical address, a physical address indicating the storage location to which the new data is written is mapped to the logical address in the lookup table. Accordingly, the data is updated, and the data written to the original storage location becomes invalid data in the memory system 105. That is, a physical address indicating a storage location to which the invalid data is stored is not associated with the logical address and thus it is not likely to be accessed by the host device 102. In the lookup table, the data stored in a storage location indicated by the physical address associated with the logical address is referred to as valid data in the memory system 105. That is, the valid data is data that may be accessed by the host device 102.

The valid data and the invalid data in the memory system 105 described here do not necessarily match the valid data and the invalid data managed in the host device 102 described above. Specifically, the host device performs a process to write update data to another zone (logical address). Thus, data not updated and old data whose update data is written to another zones are mixed in the zone of the memory system 105. This is called fragmentation. In this case, from the viewpoint of the memory system 105, data is only written to another zone; thus, it cannot be determined that the data in the original zone has been updated. Thus, valid data and invalid data in the host device 102 are mixed in the valid data in the memory system 105. Hereinafter, the valid data in the host device 102 will simply be referred to as valid data.

Next, an internal configuration of the controller 106 will be described. The controller 106 includes, for example, a host interface 107, a buffer interface 108, a memory interface 109 and a CPU 110. The host interface 107, buffer interface 108, memory interface 109 and CPU 110 may be interconnected via an internal bus. The controller 106 is configured as an electronic circuit including these components.

The host interface 107 is an interface circuit that performs communications with the host device 102. The host interface 107 performs, for example, a process of receiving a command issued from the host device 102 and a process of transmitting a completion response to the host device 102. The completion response indicates that the execution of the command issued from the host device 102 has been completed.

The buffer interface 108 is an interface circuit that performs communications with the buffer memory 111. The buffer interface 108 controls communications between the controller 106 and the buffer memory 111. The buffer interface 108 is an interface circuit that enables access to the buffer memory 111, for example, at a double-data-rate (DDR). The buffer interface 108 stores data in the buffer memory 111. In addition, the buffer interface 108 reads data from the buffer memory 111.

The memory interface 109 is an interface circuit that controls the nonvolatile memory 112. The memory interface 109 is electrically connected to a plurality of flash dies 113-1 to 113-18 included in the nonvolatile memory 112. The flash dies are nonvolatile memory dies. The flash dies are each referred to as a memory chip or simply a die. The memory interface 109 is connected to each of the flash dies 113-1 to 113-18 via a plurality of channels. For example, the flash dies 113-1 to 113-18 may be treated as one bank. The bank is a unit in which a plurality of flash dies is operated in parallel by interleaving.

The CPU 110 is a processor. The CPU 110 loads control programs (firmware) into an SRAM (not shown) from the nonvolatile memory 112 or a ROM (not shown). Then, the CPU 110 executes the firmware to perform various processes. Note that the firmware may be loaded into the buffer memory 111. The CPU 110 can be configured by one or more processors.

If the memory system 105 is controlled using a control method called zoned storage, the CPU 110 manages a plurality of zones. As described above, a zone corresponds to part of the logical address range within a logical address space. The CPU 110 manages a correspondence between each of the zones and the storage area of the memory system 105. If a new zone is opened, the CPU 110 allocates one storage area to the opened zone. If the zone is reset, the CPU 110 releases the allocation between the reset zone and the storage area.

The memory system 105 allows only sequential data writing in one zone. Since, therefore, no fragmentation occurs in the zone from the viewpoint of the memory system 105, garbage collection in the memory system 105 need not be performed. By not performing garbage collection in the memory system 105, write amplifications do not increase. Therefore, the access performance (QOS) from the host device 102 does not deteriorate due to a conflict between the execution of garbage collection and the access from the host device 102.

From the viewpoint of the host device 102, however, fragmentation may occur within the zone. In the information processing system 101, therefore, the memory system 105 performs garbage collection based on a command issued from the host device 102, as will be described below. If the host device 102 specifies a zone to be performed garbage collection, it performs, as garbage collection, an operation of rewriting valid data stored in the specified zone to another zone. For example, the host device 102 transmits, to the memory system 105, a read command for reading data from a zone to be performed garbage collection and a write command for writing the read data to another zone. Alternatively, the host device 102 may transmit, to the memory system 105, a copy command for copying valid data stored in a zone to be performed garbage collection to another zone. The zone to which data is written may be a newly opened zone or an already opened zone to which data is being written. Such a garbage collection hardly affects the WAF or QoS of the memory system 105 because data is written based on the command issued by the host device 102.

If a zone including invalid data only is generated, the host device 102 issues a zone reset command to specify and reset the zone. Upon receiving the zone reset command, the memory system 105 causes the zone specified by the zone reset command to transition to empty. The zone of the empty is a zone capable of being performed the data erase operation. If the size of the zone matches the data erase unit or is a multiple of the data erase unit, the memory system 105 can perform the data erase operation on the zone that is caused to transition to the empty.

However, in recent years, the size of data that can be stored in a single physical block is increased as NAND type flash memories are highly laminated. It is thus assumed that the size of the zone is smaller than the data erase unit in order to avoid that a data management unit becomes too large. That is, it is assumed that a plurality of zones is included in one data erase unit. The memory system 105 cannot perform the data erase operation for the data erase unit until all zones in the data erase unit become empty. That is, even though a certain zone transitions to the empty, the memory system 105 cannot perform the data erase operation for this zone when a data erase unit including this zone includes a non-empty (e.g., full) zone.

The above problem can be resolved by performing garbage collection in the memory system 105 to rewrite data of the non-empty zones included in a data erase unit to another data erase unit. However, the garbage collection performed in the memory system 105 degrades the WAF and QoS of the memory system 105. Since, furthermore, garbage collection in the management of the host device 102 and garbage collection in the management of the memory system 105 are executed, the control method decreases in its efficiency.

Therefore, in the present embodiment, the memory system 105 provides the host device 102 with information of a zone which is to be garbage collected. This zone is also referred to as a garbage collection recommended zone or a garbage collection candidate zone. The host device 102 determines valid data to be rewritten by the garbage collection, based on the information of the zone provided from the memory system 105. Thus, the problem caused when the size of a zone is smaller than the data erase unit can be solved without performing garbage collection by the management of the memory system 105.

Figure 2:
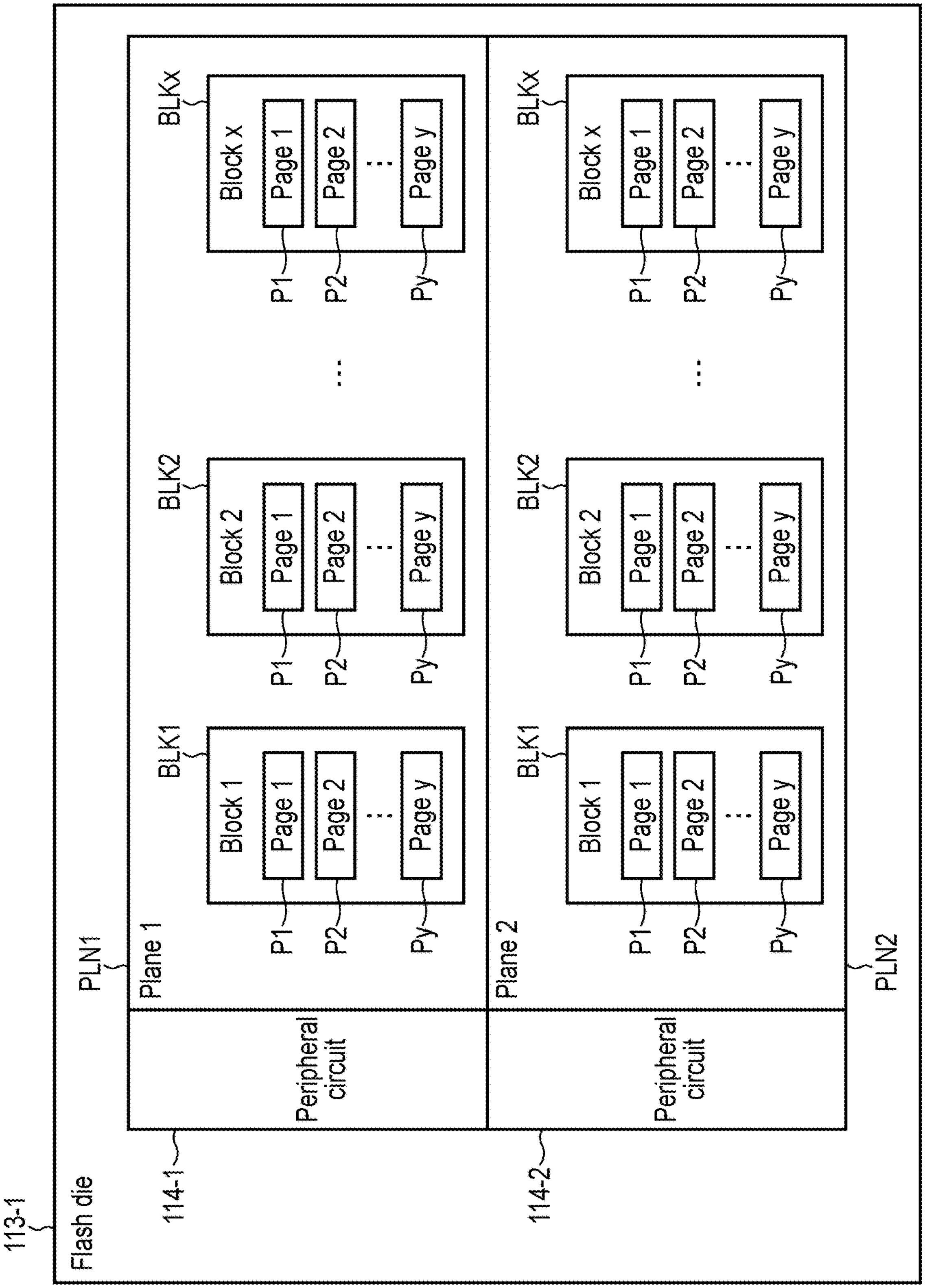
FIG. 2 is a block diagram illustrating an example of a configuration of a flash die included in the memory system according to the embodiment.

Next, an internal configuration of the flash die will be described. FIG. 2 is a block diagram illustrating an example of a configuration of a flash die included in the memory system 105 according to the embodiment. As the flash die, a flash die 113-1 will be described herein, but the other flash dies 113-2 to 113-18 have a configuration similar to that of the flash die 113-1.

The flash die 113-1 includes two planes (planes PLN1 and PLN2) and two peripheral circuits (peripheral circuits 114-1 and 114-2) corresponding to their respective two planes.

Each of the planes PLN1 and PLN2 includes a memory cell array. Each of the memory cell array includes physical blocks BLK1 to BLKx. Each of the physical blocks BLK1 to BLKx is also referred to as a flash block or a memory block. Each of the physical blocks BLK1 to BLKx includes pages P1 to Py. Each of the pages P1 to Py is a unit of a data write operation and a data read operation. Each of the pages P1 to Py includes, for example, a plurality of memory cells connected to the same word line.

Each of the peripheral circuits 114-1 and 114-2 is a circuit that controls the memory cell array of the corresponding plane. The peripheral circuit 114-1 corresponds to the plane PLN1. The peripheral circuit 114-2 corresponds to the plane PLN2. Each of the peripheral circuits 114-1 and 114-2 includes, for example, a row decoder, a column decoder, a sense amplifier and a page buffer. Upon receipt of an address and a command from the memory interface 109, each of the peripheral circuits 114-1 and 114-2 performs a program operation (data write operation), a data read operation or a data erase operation on the memory cell array of the corresponding plane.

Figure 3:
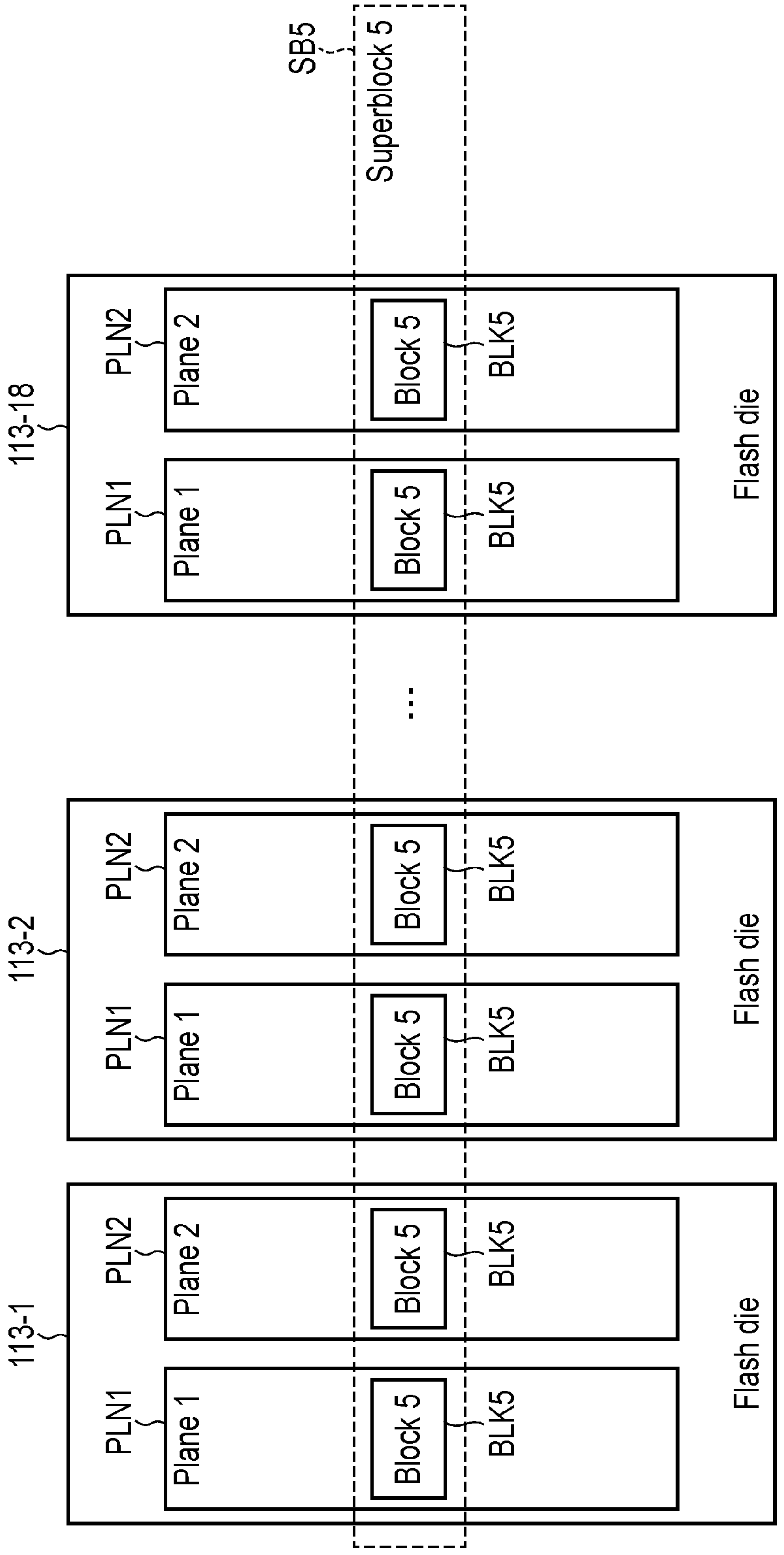
FIG. 3 is a block diagram illustrating an example of a configuration of a superblock in the memory system according to the embodiment.

Next is a description of a superblock. FIG. 3 is a block diagram illustrating an example of a configuration of a superblock in the memory system 105 according to the embodiment. The memory system 105 builds superblocks each of which is a set of physical blocks. A set of physical blocks included in a certain superblock is set of physical blocks which are selected one by one from the planes that can be operated in parallel. The superblock is also referred to as a logical block. Here, a description will be given of a case where the number of channels is 18, the number of banks is 1, and the number of planes per die is 2.

One superblock includes a total of 36 physical blocks selected one by one from the planes of 18 flash dies corresponding to a configuration of 18 channels×1 bank. Note that if each of the flash dies 113-1 to 113-18 includes only one plane, then one superblock includes a total of 18 physical blocks selected one by one from the flash dies 113-1 to 113-18.

FIG. 3 illustrates one superblock SB5 (superblock 5) including 36 physical blocks. The superblock SB5 is configured by physical blocks BLK5 of the planes PLN1 of the flash dies 113-1 to 113-18 and physical blocks BLK5 of the planes PLN2 of the flash dies 113-1 to 113-18.

The memory system 105 may perform the data erase operation in units of superblocks. It is assumed hereinafter that the data erase operation is performed in units of superblocks in the memory system 105. That is, the memory system 105 performs the data erase operation for the superblock SB5 when all data of the superblock SB5 are invalid data in the memory system 105.

For example, one superblock includes at least two storage areas. Each of the two storage areas extends over a plurality of physical blocks of the superblock. In addition, the two storage areas correspond to two zones, respectively. For example, when all zones included in the superblock SB5 are empty, the controller 106 determines that the superblock SB5 is capable of performing the data erase operation. If, therefore, at least one of the zones included in the superblock SB5 is not empty, the memory system 105 does not perform the data erase operation for the superblock SB5.

Figure 4:
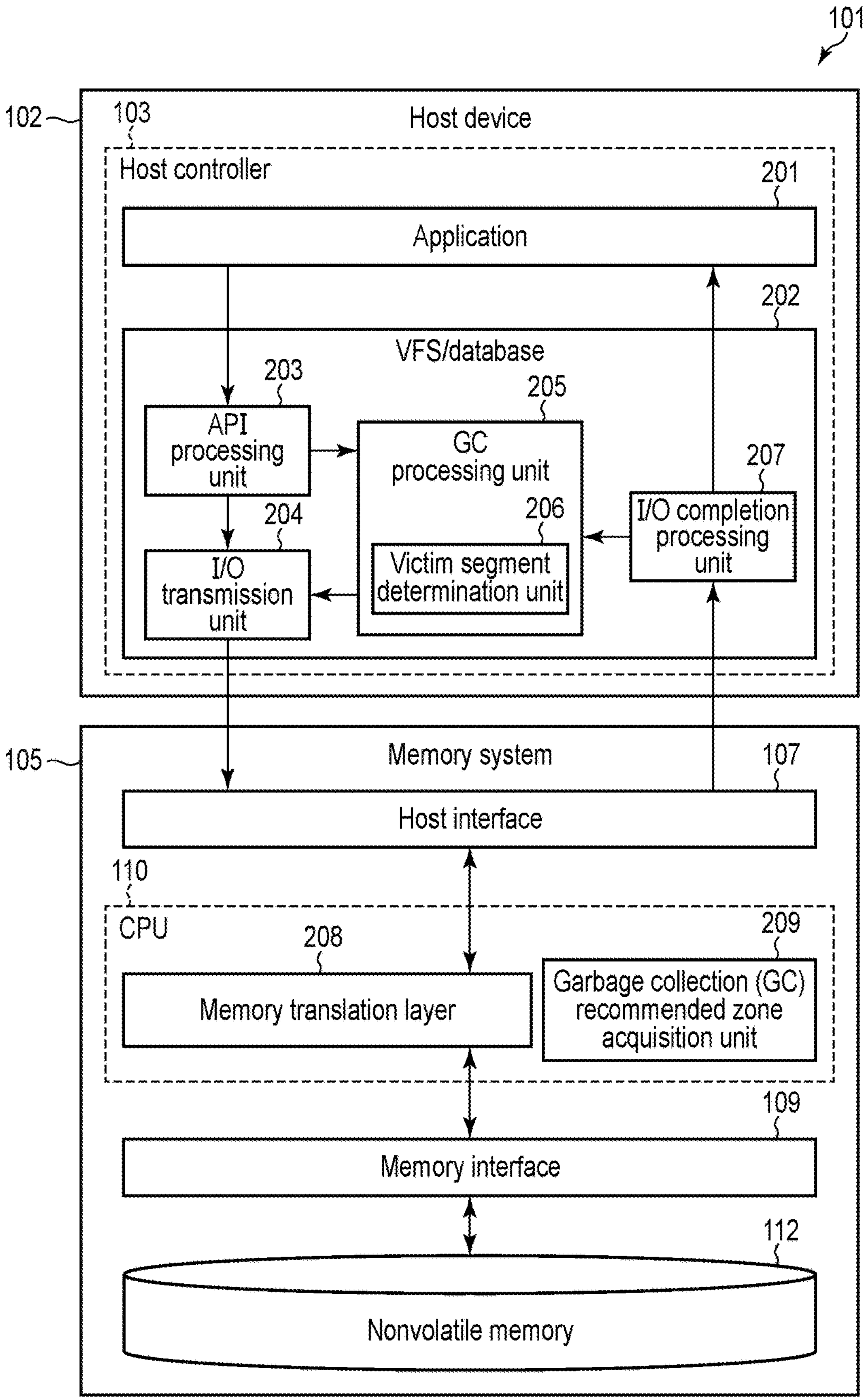
FIG. 4 is a block diagram illustrating an example of a functional configuration of the information processing system including the host device and the memory system according to the embodiment.

Next, a functional configuration of the information processing system 101 will be described. FIG. 4 is a block diagram illustrating an example of a functional configuration of the information processing system 101 including the memory system 105 and host device 102 according to the embodiment.

First is a description of the functional configuration of the host controller 103 of the host device 102. The host controller 103 includes an application 201 and a virtual file system (VFS)/database 202. The application 201 accesses the VFS/database 202 to cause access to the memory system 105.

The VFS/database 202 includes an application programming interface (API) processing unit 203, an I/O transmission unit 204, a garbage collection (GC) processing unit 205 and an I/O completion processing unit 207.

The API processing unit 203 receives access from the application 201. The API processing unit 203 interprets the received access. Then, the API processing unit 203 instructs the I/O transmission unit 204 to create a command to be issued to the memory system 105. The API processing unit 203 may also notify the GC processing unit 205 that there is no access from the application 201 for a fixed period of time or longer.

The I/O transmission unit 204 creates a command to be transmitted to the memory system 105. The I/O transmission unit 204 creates a command based on an instruction from the API processing unit 203. The I/O transmission unit 204 also creates a command based on an instruction from the GC processing unit 205. The I/O transmission unit 204 transmits the created command to the host interface 107 of the memory system 105. The I/O transmission unit 204 transmits, for example, an I/O command and a management command.

The I/O command includes, for example, a write command, a read command and a copy command.

The write command is a command for writing data to the nonvolatile memory 112. The write command is a command for specifying a logical address and the size of write data and making a request to write the write data to a storage location corresponding to the specified logical address. The logical address specified by the write command is also referred to as a start logical address (start LBA) or a write destination logical address. Specifically, the write command specifies a start logical address (start LBA), the size of write data, and an address indicating a storage location in the host memory 104 where the write data is stored. When a plurality of zones is managed in the memory system 105, the start logical address specified by the write command may include information that specifies a write destination zone among the plurality of zones. In this case, the write command includes information indicating an offset from the initial logical address of the write destination zone to a storage location where the write data is to be written.

In addition, a zone append command may be used as a command for writing data to the memory system 105. The zone append command includes information for specifying a zone to which data is to be written, instead of the start logical address. In data write based on the zone append command, a logical address to which data is to be written is determined by the controller 106 of the memory system 105 such that data is sequentially written to the zone. Thus, a completion response corresponding to the zone append command includes a logical address (offset) corresponding to the written data.

The read command is a command for reading data from the nonvolatile memory 112. The read command is a command for specifying a logical address and making a request to read data from a storage location corresponding to the specified logical address. The logical address specified by the read command is also referred to as a start logical address (start LBA). Specifically, the read command specifies a logical address, the size of data to be read, and an address indicating a storage location in the host memory 104 to which the read data is transferred. When a plurality of zones is managed in the memory system 105, the start logical address specified by the read command includes information indicating a read target zone and information indicating an offset from the initial logical address of the read target zone to a storage location in which read target data is stored.

The copy command is a command for making a request to copy data written to a storage location corresponding to a copy source logical address to a storage location corresponding to a copy destination logical address. The copy command specifies the copy source logical address, the copy destination logical address, and the size of data to be copied. The copying of data from the storage location corresponding to the copy source logical address to the storage location corresponding to the copy destination logical address is performed at the interior of the memory system 105. Therefore, in the data copying operation, no data is transferred from the memory system 105 to the host device 102 or no data is transferred from the host device 102 to the memory system 105. Data to be copied is read from the storage location corresponding to the copy source logical address among a plurality of storage locations included in a storage area corresponding to a copy source zone including the copy source logical address. The read data is written to a storage location corresponding to the copy destination logical address among a plurality of storage locations included in a storage area corresponding to a copy destination zone including the copy destination logical address.

The management command includes, for example, a zone reset command.

The zone reset command is a command for causing a zone to transition to an empty. The zone reset command includes information that specifies a zone. Upon receiving the zone reset command, the memory system 105 causes the zone specified by the zone reset command to transition to the empty.

The GC processing unit 205 performs garbage collection. The GC processing unit 205 starts the garbage collection, for example, when a particular period of time or more has elapsed since the last access by the application 201 and a particular amount or more of data has been written since the last garbage collection was performed. When the GC processing unit 205 starts garbage collection, the GC processing unit 205 instructs the I/O transmission unit 204 to issue a command for requesting a zone which is to be garbage collected, that is, a command for acquiring a zone for which the garbage collection is to be performed. This command is also referred to as a garbage collection (GC) recommended zone acquisition command.

The I/O completion processing unit 207 processes a completion response received from the memory system 105. The I/O completion processing unit 207 processes the completion response and notifies the application 201 that a process based on a command corresponding to the completion response has been completed. Upon receipt of a completion response corresponding to the write command, the I/O completion processing unit 207 updates metadata indicating the correspondence between data associated with the write command and a logical address. Upon receipt of a completion response corresponding to the read command, the I/O completion processing unit 207 obtains data which is read from the nonvolatile memory 112. Upon receipt of a completion response corresponding to the GC recommended zone acquisition command, the I/O completion processing unit 207 acquires from the memory system 105 information indicating a zone which is to be garbage collected. The I/O completion processing unit 207 transmits the information indicating the acquired zone to the GC processing unit 205.

The GC processing unit 205 includes a Victim segment determination unit 206.

The Victim segment determination unit 206 determines valid data to be moved by garbage collection. For example, based on information indicating a zone to be garbage collected, which is provided from the memory system 105 via the I/O completion processing unit 207, and mapping information managed in the host device 102, the Victim segment determination unit 206 determines a zone to be garbage collected. The zone to be garbage collected is also referred to as a Victim zone. Then, the Victim segment determination unit 206 determines as a Victim segment the valid data stored in the determined Victim zone. The Victim segment determination unit 206 determines data to be moved such that the size of the data to be moved becomes a multiple of a data write unit (segment). The data to be moved is also referred to as a Victim segment. The segment is set by the host device 102 or the memory system 105. While one logical block address (LBA) is 4KiB, the segment is, for example, 2MiB. The Victim segment determination unit 206 may also determine the Victim segment such that all valid data included in the Victim zone are moved to another zone.

The GC processing unit 205 performs garbage collection to rewrite data corresponding to the Victim segment determined by the Victim segment determination unit 206 to another zone. For example, the GC processing unit 205 instructs the I/O transmission unit 204 to issue a read command for specifying the Victim segment and to issue a write command for writing the read valid data to another zone. Alternatively, the GC processing unit 205 may instruct the I/O transmission unit 204 to issue a copy command for copying the valid data corresponding to the Victim segment to another zone.

Next, a functional configuration of the CPU 110 of the memory system 105 will be described. The CPU 110 includes a memory translation layer 208 and a garbage collection (GC) recommended zone acquisition unit 209.

The memory translation layer 208 manages mapping information between a logical address used by the host device 102 and a physical address indicating a storage location in the nonvolatile memory 112. Upon receipt of a command from the host device 102, the memory translation layer 208 performs address translation from a logical address to a physical address. The memory translation layer 208 refers to the lookup table to obtain a physical address corresponding to a logical address specified by the command transmitted from the host device 102. Based on the acquired physical address, the memory translation layer 208 transmits an instruction for writing and reading data to the memory interface 109.

The GC recommended zone acquisition unit 209 identifies a zone which is to be garbage collected (GC recommended zone). Upon receiving a GC recommended zone acquisition command via the host interface 107, the GC recommended zone acquisition unit 209 identifies the GC recommended zone and transmits the identified GC recommended zone to the host device 102 via the host interface 107. The GC recommended zone acquisition unit 209 refers to the zone status management table to select the GC recommended zone. The GC recommended zone acquisition unit 209 may select two or more zones as GC recommended zones.

In addition, upon receiving the GC recommended zone acquisition command, the GC recommended zone acquisition unit 209 may create the GC recommended zone list including information indicating a zone which is to be garbage collected. Then, the GC recommended zone acquisition unit 209 transmits the created GC recommended zone list to the host device 102 through the host interface 107. The GC recommended zone acquisition unit 209 may create the GC recommended zone list in advance. The GC recommended zone acquisition unit 209 stores, for example, the created GC recommended zone list in the buffer memory 111 or the like. In this case, the GC recommended zone acquisition unit 209 reads the GC recommended zone list from the buffer memory 111 upon receipt of the GC recommended zone acquisition command from the host device 102. Then, the GC recommended zone acquisition unit 209 transmits the read GC recommended zone list to the host device 102.

Next, each process that is performed in the information processing system 101 will be described.

First is a description of a write process. The write process is started when the application 201 requests the API processing unit 203 to write data to the memory system 105.

The API processing unit 203 assigns a logical address of a write destination to data to be written, based on a request for writing data from the application 201. Then, the API processing unit 203 instructs the I/O transmission unit 204 to create a write command to specify the assigned logical address.

The I/O transmission unit 204 creates a write command based on an instruction from the API processing unit 203 and transmits the created write command to the host interface 107 of the memory system 105.

The memory translation layer 208 of the CPU 110 receives the write command via the host interface 107. The memory translation layer 208 determines a physical address of a write destination, based on the logical address specified by the received write command. The memory translation layer 208 designates the determined physical address and instructs the nonvolatile memory 112 to write data through the memory interface 109. Based on a zone to which the logical address of the write destination belongs, the memory translation layer 208 can determine a storage location in a storage area to which the zone is assigned. The nonvolatile memory 112 writes data, based on an instruction from the memory interface 109.

The host interface 107 transmits a completion response corresponding to the received write command to the I/O completion processing unit 207.

Upon receiving the completion response, the I/O completion processing unit 207 notifies the application 201 that the write process based on the write command has been completed. The I/O completion processing unit 207 also updates the correspondence between the data and the logical address based on the completion of data write.

Next, a read process will be described. The read process is started when the application 201 requests the API processing unit 203 to read data from the memory system 105.

The API processing unit 203 acquires a logical address corresponding to data to be read, based on the request for reading the data from an application 201. Then, the API processing unit 203 instructs the I/O transmission unit 204 to create a read command that specifies the acquired logical address (read target logical address).

The I/O transmission unit 204 creates a read command based on the instruction from the API processing unit 203 and transmits the generated read command to the host interface 107 of the memory system 105.

The memory translation layer 208 of the CPU 110 receives the read command via the host interface 107. The memory translation layer 208 determines a physical address which is a read target, based on the logical address specified by the received read command. The memory translation layer 208 designates the determined physical address and instructs the nonvolatile memory 112 to read data via the memory interface 109. Based on a zone to which the logical address (read target logical address) belongs, the memory translation layer 208 can determine a storage location in a storage area to which the zone is assigned. The nonvolatile memory 112 reads data, based on the instruction from the memory interface 109.

The host interface 107 transmits a completion response corresponding to the received read command and the data read from the nonvolatile memory 112 to the I/O completion processing unit 207.

Upon receiving the completion response, the I/O completion processing unit 207 notifies the application 201 that the data read process based on the read command has been completed.

Next, a garbage collection operation will be described. The GC processing unit 205 starts a garbage collection operation. The garbage collection operation is started, for example, when the free capacity of the memory system 105 falls below a threshold value, when fragmentation is detected by writing data to the memory system 105, or when a certain period of time or more has elapsed since the last garbage collection. The GC processing unit 205 may perform the garbage collection operation in response to the notification from the API processing unit 203 that access from the application 201 is not occurred for a certain period of time or longer.

First, the GC processing unit 205 instructs the I/O transmission unit 204 to issue a GC recommended zone acquisition command. The I/O transmission unit 204 creates a GC recommended zone acquisition command and transmits the created GC recommended zone acquisition command to the memory system 105.

The GC recommended zone acquisition unit 209 of the memory system 105 receives the GC recommended zone acquisition command through the host interface 107. Upon receiving the GC recommended zone acquisition command, the GC recommended zone acquisition unit 209 transmits to the host device 102 a GC recommended zone list including information indicating a zone which is to be garbage collected and which is determined based on a zone status management table. For example, the GC recommended zone acquisition unit 209 selects a superblock in which a ratio of the full zones is lower than a threshold value, among the superblocks composed of only the full zone and the empty zone. Then, the GC recommended zone acquisition unit 209 stores information indicating one or more full zones included in the selected superblock, in the GC recommended zone list. That is, the GC recommended zone list stores information indicating a zone in which the data erase operation on a superblock including the zone can be performed when the zone becomes empty.

The I/O completion processing unit 207 receives the GC recommended zone list through the host interface 107. Then, the I/O completion processing unit 207 transmits the received GC recommended zone list to the Victim segment determination unit 206 of the GC processing unit 205.

The Victim segment determination unit 206 determines a garbage collection target zone based on the received GC recommended zone list. In this, the Victim segment determination unit 206 determines the garbage collection target zone by referring to not only the GC recommended zone list but also the mapping of valid data in each zone.

Then, the Victim segment determination unit 206 determines the valid data in the garbage collection target zone as a Victim segment.

The GC processing unit 205 instructs the I/O transmission unit 204 to issue a read command that specifies the Victim segment determined by the Victim segment determination unit 206.

When data is read based on the read command, the GC processing unit 205 determines a logical address of a write destination of the read Victim segment. Then, the GC processing unit 205 instructs the I/O transmission unit 204 to issue a write command to write the read data to a new logical address.

Accordingly, the Victim segment is moved from the garbage collection target zone to a new zone. The garbage collection target zone thus includes invalid data only. Therefore, the I/O transmission unit 204 issues, to the memory system 105, a zone reset command that specifies the garbage collection target zone.

Upon receiving the zone reset command, the CPU 110 of the memory system 105 causes the zone specified by the zone reset command to transition to the empty. In response to the transition of the zone to the empty, the CPU 110 updates the zone status management table.

In the foregoing descriptions, the read command and the write command are transmitted from the host device 102 to the memory system 105 when data is moved in the garbage collection. However, a copy command may be used instead of the read command and the write command.

Figure 5:
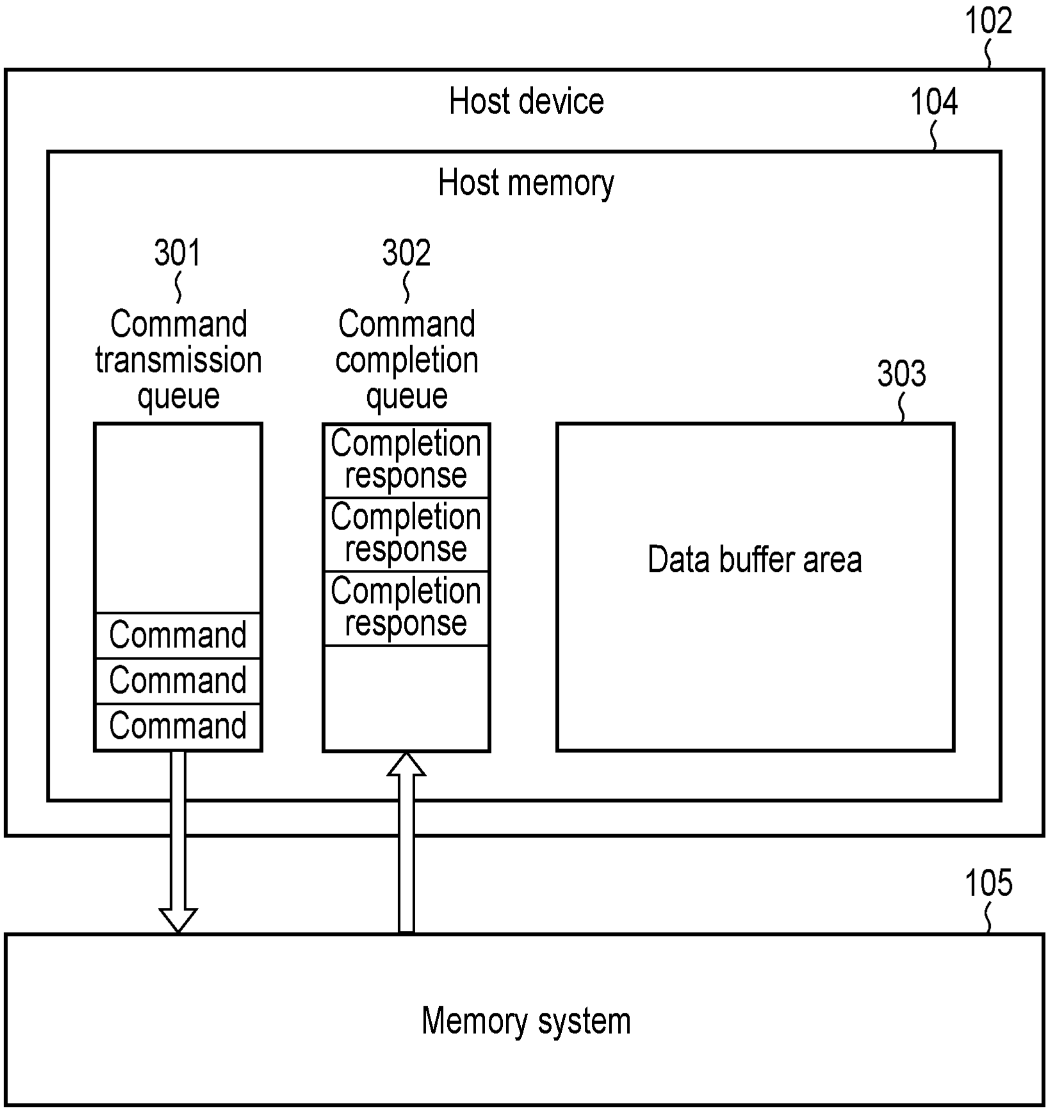
FIG. 5 is a block diagram illustrating an example of a configuration of a host memory included in the host device according to the embodiment.

Next, an example of a configuration of the host memory 104 will be described. FIG. 5 is a block diagram illustrating an example of a configuration of the host memory 104 included in the host device 102 according to the embodiment.

The storage area of the host memory 104 includes a storage area used as a command transmission queue 301, a storage area used as a command completion queue 302 and a storage area used as a data buffer area 303.

The command transmission queue 301 stores one or more commands to be transmitted to the memory system 105. The I/O transmission unit 204 of the host controller 103 stores the created command in the command transmission queue 301 in order to transmit (or provide) the command to the memory system 105. Then, the host interface 107 of the memory system 105 fetches (or receives) the command stored in the command transmission queue 301. The command is thus transmitted from the host device 102 to the memory system 105. The command transmission queue 301 is also referred to as a submission queue (SQ).

The command completion queue 302 stores one or more completion responses generated by the controller 106. The controller 106 generates a completion response, based on the command received from the host device 102, and stores the generated completion response in the command completion queue 302. A completion response corresponding to the write command includes, for example, information indicating that data has normally been written based on the write command. A completion response corresponding to the read command includes, for example, information indicating that data has normally been read based on the read command. When the completion response corresponding to the read command is processed, the host controller 103 fetches (or receives) from the data buffer area 303 the data which is read based on the read command.

A completion response corresponding to the GC recommended zone acquisition command includes, for example, information indicating that the process of acquiring the GC recommended zone list has been normally performed. When the completion response is processed, the host controller 103 acquires (or receives) the GC recommended zone list from the data buffer area 303. Hereinafter, for simplicity, processing the completion response and then transferring data from the memory system 105 to the host device 102 will be referred to as transmitting the completion response and the data from the memory system 105 to the host device 102.

Each of the command transmission queue 301 and the command completion queue 302 may be implemented by, for example, a ring buffer. The ring buffer includes a plurality of entries. The ring buffer is managed using two pointers of a head pointer and a tail pointer. The head pointer is a pointer indicating an entry that stores a command or a completion response to be processed next. The tail pointer is a pointer indicating an entry in which a command or a completion response is stored next.

The data buffer area 303 is a storage area in which data is temporarily stored. The data buffer area 303 temporarily stores data which is to be written to the nonvolatile memory 112 based on the write command. The data buffer area 303 temporarily stores data which is read from the nonvolatile memory 112 based on the read command. The data buffer area 303 also temporarily stores the GC recommended zone list which is received from the memory system 105 based on the GC recommended zone list acquisition command.

Figure 6:
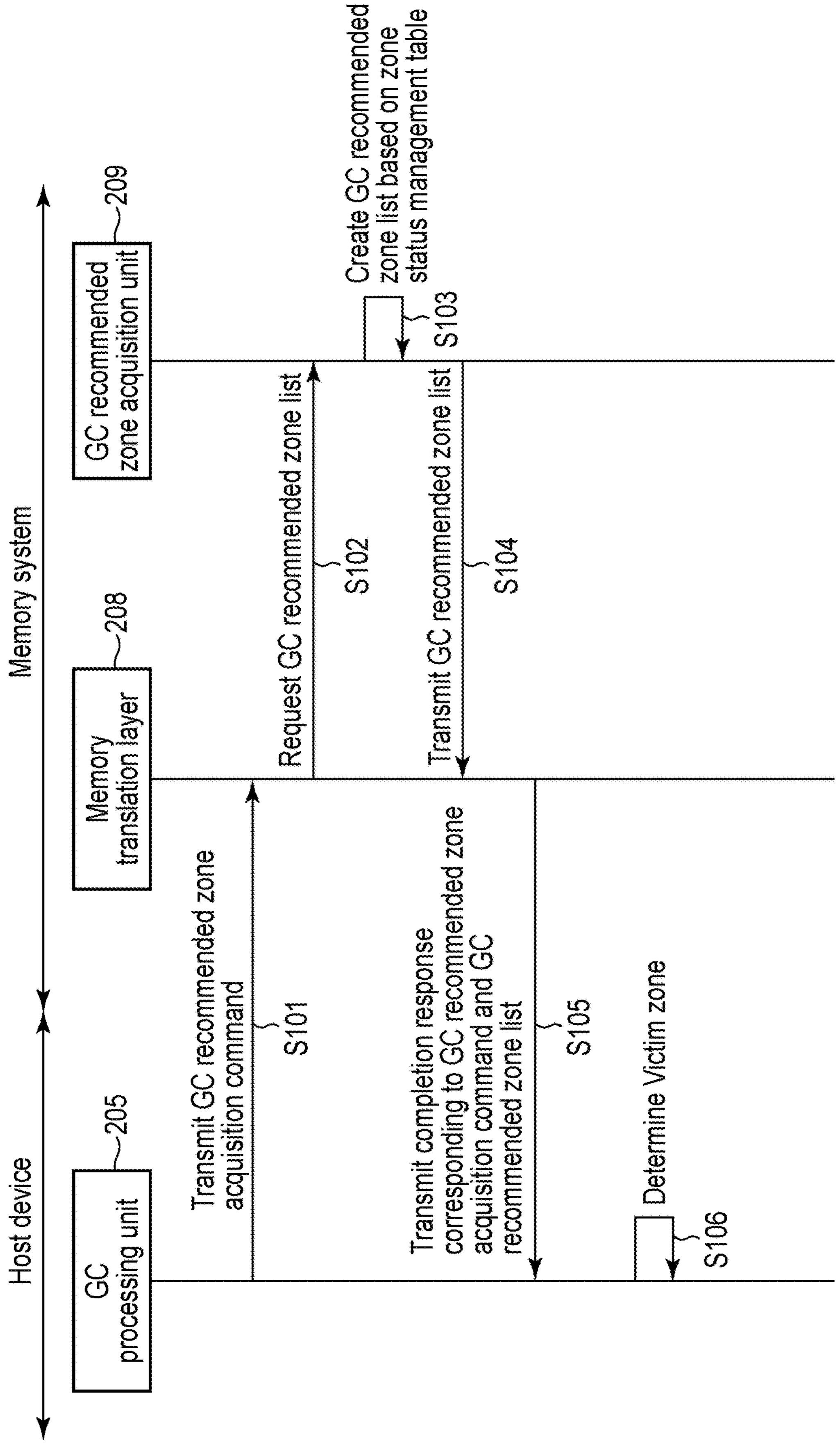
FIG. 6 is a sequence diagram illustrating a procedure of a Victim zone determination process that is performed in the information processing system including the host device and the memory system according to the embodiment.

Next, a procedure of the Victim zone determination process. FIG. 6 is a sequence diagram illustrating a procedure of a Victim zone determination process that is performed in the information processing system 101 including the host device 102 and the memory system 105 according to the embodiment.

The GC processing unit 205 starts garbage collection including the Victim zone determination process, for example, when fragmentation occurs after a particular amount or more of data is written and when there is no access to the memory system 105 from the host device 102. The GC processing unit 205 may also start the garbage collection when a certain period of time has elapsed since the last garbage collection. In addition, the GC processing unit 205 starts the garbage collection when the free capacity of the memory system 105 decreases. When the GC processing unit 205 starts garbage collection, the GC processing unit 205 performs the Victim zone determination process to determine a garbage collection target zone.

First, the GC processing unit 205 of the host device 102 transmits a GC recommended zone acquisition command to the memory translation layer 208 of the memory system 105 (S101).

Upon receiving the GC recommended zone acquisition command in S101, the memory translation layer 208 requests a GC recommended zone list from the GC recommended zone acquisition unit 209 (S102).

The GC recommended zone acquisition unit 209 receiving the request in S102 creates a GC recommended zone list based on the zone status management table (S103). In a case where the GC recommended zone list is created in advance based on the zone status management table and is stored in the buffer memory 111, the GC recommended zone acquisition unit 209 may read from the buffer memory 111 the GC recommended zone list.

The GC recommended zone acquisition unit 209 transmits the GC recommended zone list created in S103 to the memory translation layer 208 (S104).

The memory translation layer 208 transmits to the GC processing unit 205 a completion response corresponding to the GC recommended zone acquisition command received in S101 and the GC recommended zone list received in S104 (S105).

The GC processing unit 205 determines a Victim zone based on the GC recommended zone list received in S105 (S106). The GC processing unit 205 may determine the Victim zone by referring not only to the GC recommended zone list received in S105 but also to metadata indicating valid data in each zone managed by the host device 102.

Thus, the memory system 105 can provide the host device 102 with the zone which is to be garbage collected. The host device 102 can determine a garbage collection target zone (Victim zone) based on information (GC recommended zone list) indicating the zone which is to be garbage collected, which is provided from the memory system 105.

Therefore, the memory system 105 can provide the host device 102 with a GC recommended zone list such that garbage collection can be performed to generate more free space than a size of which the data to be rewritten.

Figure 7:
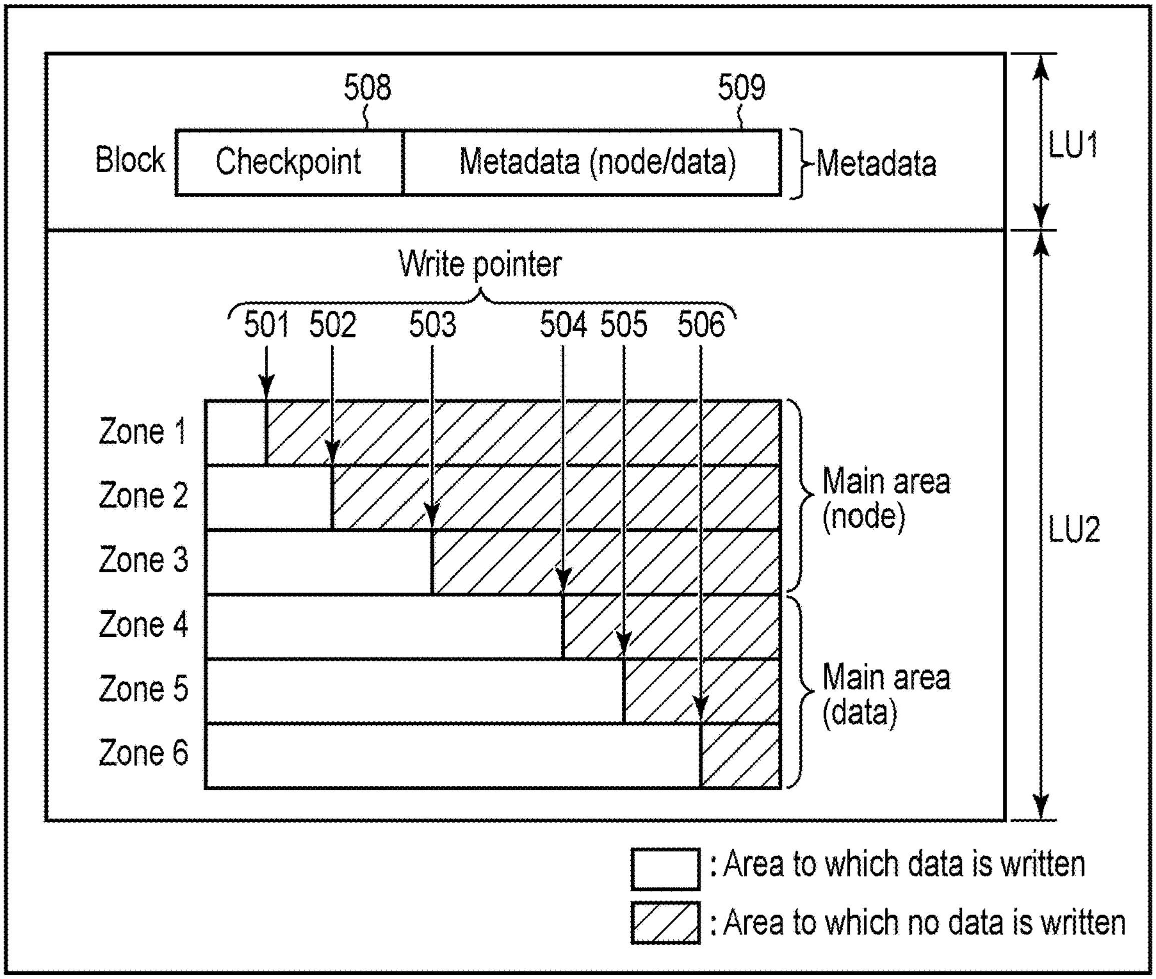
FIG. 7 is a diagram illustrating an example of a configuration of a logical unit in the memory system according to the embodiment.

Next, a logical unit in the memory system 105 will be described. FIG. 7 is a diagram illustrating an example of a configuration of the logical unit in the memory system 105 according to the embodiment. In this example, the memory system 105 and the host device 102 manage two logical units (LUs: LU1 and LU2). When performing an access to the memory system 105, the host device 102 selects one of the logical units to perform the access to the memory system

105. The memory system 105 and the host device 102 may manage namespaces instead of the LUs.

The LU1 is a logical storage area used to store management data. The LU1 is also referred to as, for example, a block area. Any of a plurality of blocks included in the flash dies 113-1 to 113-18 of the memory system 105 may be used as block areas. The management data stored in the LU1 is, for example, data used by the host device 102 to manage data stored in the memory system 105. The LU1 is, for example, a logical space randomly accessed by the host device 102. The block included in the LU1 stores a checkpoint 508 and metadata 509.

The metadata 509 is data indicating a correspondence between user data and a logical address. With respect to each user data, the metadata 509 includes, for example, an identifier indicating a zone to which the user data is written, an offset from the start location of the zone, and a size of the user data. The size of the user data may be, for example, the number of segments. The host device 102 refers to the metadata 509 to manage whether user data in each zone is valid or not.

The checkpoint 508 is a copy of the metadata 509 at a specific time. For example, the host device 102 generates a copy of the metadata 509 when the metadata 509 is updated in response to completion of data write based on a write command. The host device 102 updates the checkpoint 508 with the generated copy of the metadata 509. The checkpoint 508 is used to reconstruct the metadata 509, for example, when the memory system 105 is restarted after its power shutdown.

The LU2 is a logical storage area used to store user data. The LU2 is also referred to, for example, a zone area or a main area. The LU2 is divided into a plurality of zones. The host device 102 specifies a zone to which each user data is to be written such that the user data is classified according to its characteristics, for example. In addition, the memory system 105 manages the status of each zone and a write pointer corresponding to each zone. The write pointer indicates a logical address to which data is written next in the corresponding zone. That is, the write pointer indicates a logical address next to the end logical address of the logical addresses to which data is written in the corresponding zone. In a case where no data has been written to the corresponding zone, the write pointer indicates the initial logical address of the zone. The controller 106 uses the write pointer to control data write to the zone such that the data write is sequentially executed within the logical address range of the zone. In addition, the host device 102 issues write commands for each zone such that the data write is sequentially executed within each zone. When data is written to a zone, the memory system 105 updates the write pointer according to the size of the written data. Upon receiving a zone reset command, the controller 106 updates a write pointer corresponding to a zone specified by the zone reset command to indicate the initial logical address of the zone. This process is also referred to as zone reset. Thus, the zone specified by the zone reset command becomes a zone to which data can be written from the head of the zone.

In FIG. 7, the LU2 includes six zones 1 to 6. For example, the zones 1 to 3 are main areas used to store nodes. The zones 4 to 6 are main areas used to store user data. The nodes stored in the zones 1 to 3 are, for example, data that directly or indirectly designates the user data stored in the zones 4 to 6. Write pointers 501, 502, 503, 504, 505 and 506 correspond to the zones 1, 2, 3, 4, 5 and 6, respectively.

The zones 1 to 6 may be managed to store data having different characteristics. For example, the zone 1 stores data with a high update frequency (hot data) among the nodes, the zone 3 stores data with a low update frequency (cold data) among the nodes, and the zone 2 stores data with an intermediate update frequency (warm data) among the nodes. In addition, for example, the zone 4 stores data with a high update frequency (hot data) among the data, the zone 6 stores data with a low update frequency (cold data) among the data, and the zone 5 stores data with an intermediate update frequency (warm data) among the data. In the case of using the F2FS, an example of data stored in each zone is as follows. The zone 1 stores a direct node block of a directory. The zone 2 stores a direct node block of a file. The zone 3 stores a non-direct node block. The zone 4 stores a directory. The zone 5 stores updated data. The zone 6 stores user specified data, data moved by garbage collection, and multimedia data.

In the above case, the characteristics of data to be stored vary from zone to zone. However, the zones need not be necessarily managed such that the characteristics of data to be stored vary from zone to zone.

Figure 8:
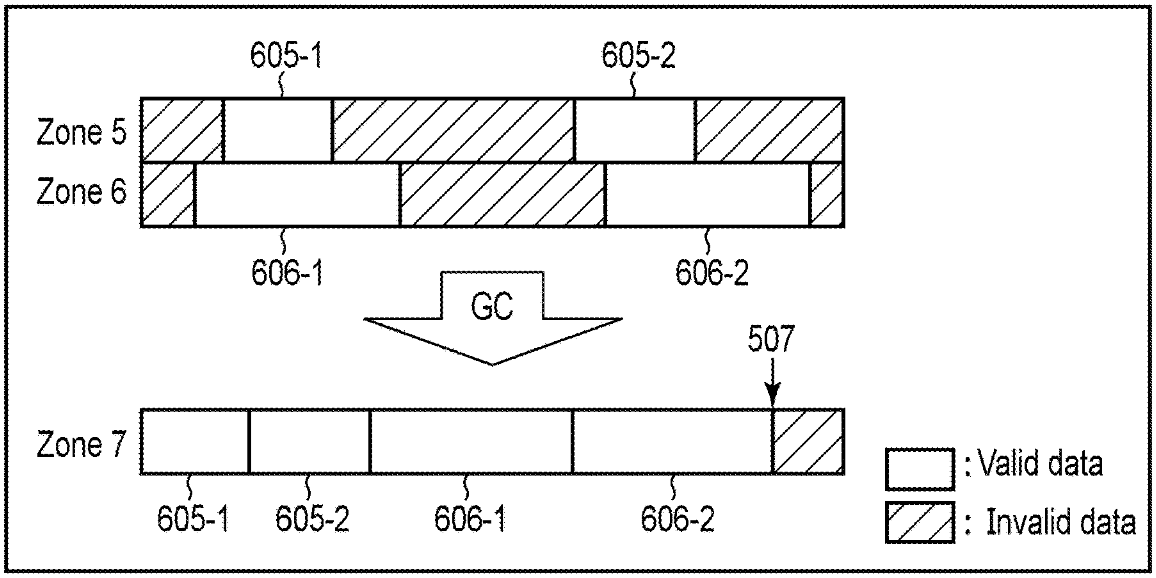
FIG. 8 is a diagram illustrating an example of a garbage collection performed by the host device and the memory system according to the embodiment.

Next, movement of data in garbage collection will be described. FIG. 8 is a diagram illustrating an example of garbage collection performed by the host device 102 and the memory system 105 according to the embodiment. In this example, the zones 5 and 6 are determined as Victim zones.

FIG. 8 illustrates in its upper part zones 5 and 6 before garbage collection is performed. The zone 5 stores valid data 605-1 and valid data 605-2. The other storage area of the zone 5 stores invalid data. The zone 6 stores valid data 606-1 and valid data 606-2. The other storage area of the zone 6 stores invalid data.

The GC processing unit 205 determines the zones 5 and 6 as Victim zones. The GC processing unit 205 determines the Victim zones based on, for example, the GC recommended zone list, the time elapsed since data was written to each zone, and the amount of valid data included in each zone. When the Victim segment determination unit 206 of the GC processing unit 205 determines the zones 5 and 6 as the Victim zones, the Victim segment determination unit 206 determines segments corresponding to valid data among the data stored in the zones 5 and 6 as the Victim segments. Here, the valid data 605-1 and 605-2 stored in the zone 5 and the valid data 606-1 and 606-2 stored in the zone 6 are determined the Victim segments.

First, the host device 102 performs a process of reading valid data.

The host device 102 transmits to the memory system 105 read commands to read the valid data 605-1, 605-2, 606-1 and 606-2. Upon receiving the read commands, the memory system 105 reads the valid data 605-1, 605-2, 606-1 and 606-2 and transmits them to the host device 102. For example, the host device 102 transmits to the memory system 105 a first read command to read the valid data 605-1, a second read command to read the valid data 605-2, a third read command to read the valid data 606-1 and a fourth read command to reading the valid data 606-2.

Then, the host device 102 starts a process of writing the read valid data to another zone. The host device 102 selects any empty zone from the empty zones managed by the host device 102. For example, the host device 102 transmits to the memory system 105 a command to open a zone 7 that is an empty zone. This command may simply be a write command that specifies the zone 7 as a write destination zone. In response to receiving this command, the memory system 105 allocates a storage area, to which new data can be written, to the zone 7. For example, the memory system 105 selects a superblock capable of performing the data erase operation, and allocates a part of the storage area included in the selected superblock to the zone 7. In addition, the host device 102 may select, as the write destination zone, an already opened zone to which data is being written, instead of the empty zone.

Then, the host device 102 transmits to the memory system 105 a write command to write the valid data 605-1, 605-2, 606-1 and 606-2 which are read from the zones 5 and 6 to the zone 7. Based on the write command received from the host device 102, the memory system 105 writes the valid data 605-1, 605-2, 606-1 and 606-2 to the zone 7. Then, the memory system 105 updates a write pointer 507 corresponding to the zone 7 in response to the writing of data to the zone 7.

The host device 102 receives a completion response corresponding to the write command, and updates the metadata 509 so that the data stored in the zones 5 and 6 are invalidated in response to the normal writing of data. Upon updating the metadata 509, the host device 102 generates a copy of the updated metadata 509. Then, the host device 102 updates the checkpoint 508 with the copy of the generated metadata 509.

In response to that the zones 5 and 6 become zones which store the invalid data only, the host device 102 transmits zone reset commands specifying the zones 5 and 6 to the memory system 105. The controller 106 of the memory system 105 that has received the zone reset command causes the zones 5 and 6 to transition to the empty. In a case where the zones included in a superblock to which the zone 5 or 6 belongs are all empty, the controller 106 can perform the data erase operation for the superblock.

In the above case, the garbage collection is performed by the host device 102 transmitting the read and write commands to the memory system 105. However, the garbage collection may be performed by transmitting a copy command instead of the read and the write commands. The copy command to be transmitted specifies the logical addresses, which corresponds to the valid data 605-1, 605-2, 606-1 and 606-2 respectively stored in the zones 5 and 6, as addresses of the copy source, and specifies the zone 7 as the logical addresses of the copy destination. In a case where garbage collection is performed by the copy command, data moved by the garbage collection need not be transferred between the host device 102 and the memory system 105.

Figure 9:
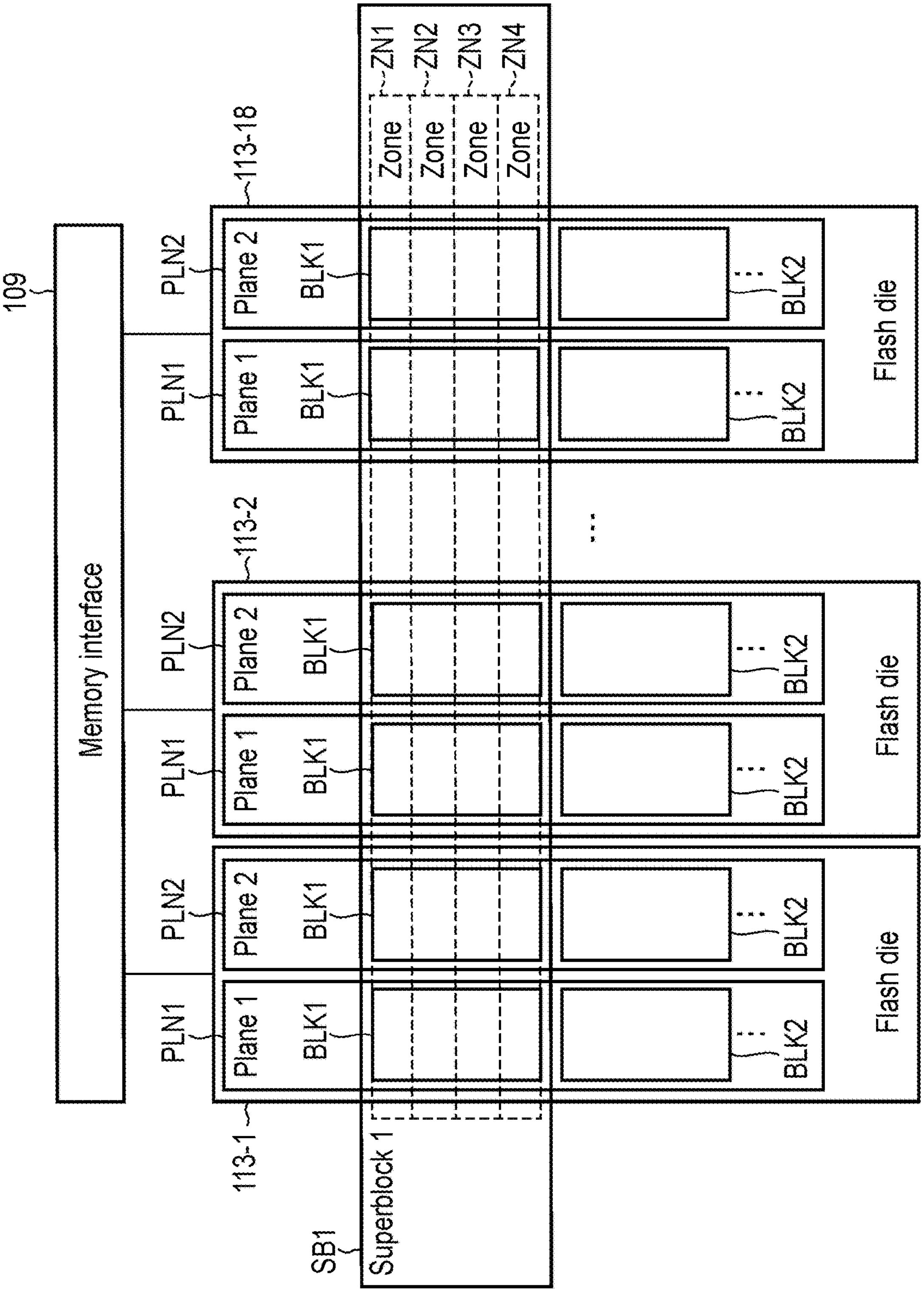
FIG. 9 is a block diagram illustrating an example of a correspondence between a superblock and a zone in the memory system according to the embodiment.

Next, a correspondence between a superblock and a zone will be described. FIG. 9 is a block diagram illustrating an example of a correspondence between a superblock and a zone in the memory system 105 according to the embodiment.

As in the example described with reference to FIG. 3, in the example of FIG. 9, too, one superblock is configured by 36 physical blocks. The 36 physical blocks are selected one by one from the planes that can be operated in parallel. In FIG. 9, the block BLK1 of the plane PLN1 of the flash die 113-1, the block BLK1 of the plane PLN2 of the flash die 113-1, the block BLK1 of the plane PLN1 of the flash die 113-2, the block BLK1 of the plane PLN2 of the flash die 113-2, . . . , the block BLK1 of the plane PLN1 of the flash die 113-18, and the block BLK1 of the plane PLN2 of the flash die 113-18 constitute a superblock SB1.

The storage areas included in the superblock SB1 correspond to zones ZN1, ZN2, ZN3 and ZN4. That is, one superblock includes four storage areas corresponding to four zones, respectively. In addition, the storage area corresponding to one zone extends over the physical blocks constituting the superblock.

The physical blocks can thus be operated in parallel in accessing the zones. If, therefore, the sizes of the zones are the same, higher access can be gained than in a case where the storage areas corresponding to the zones do not extend over a plurality of physical blocks.

Figure 10:
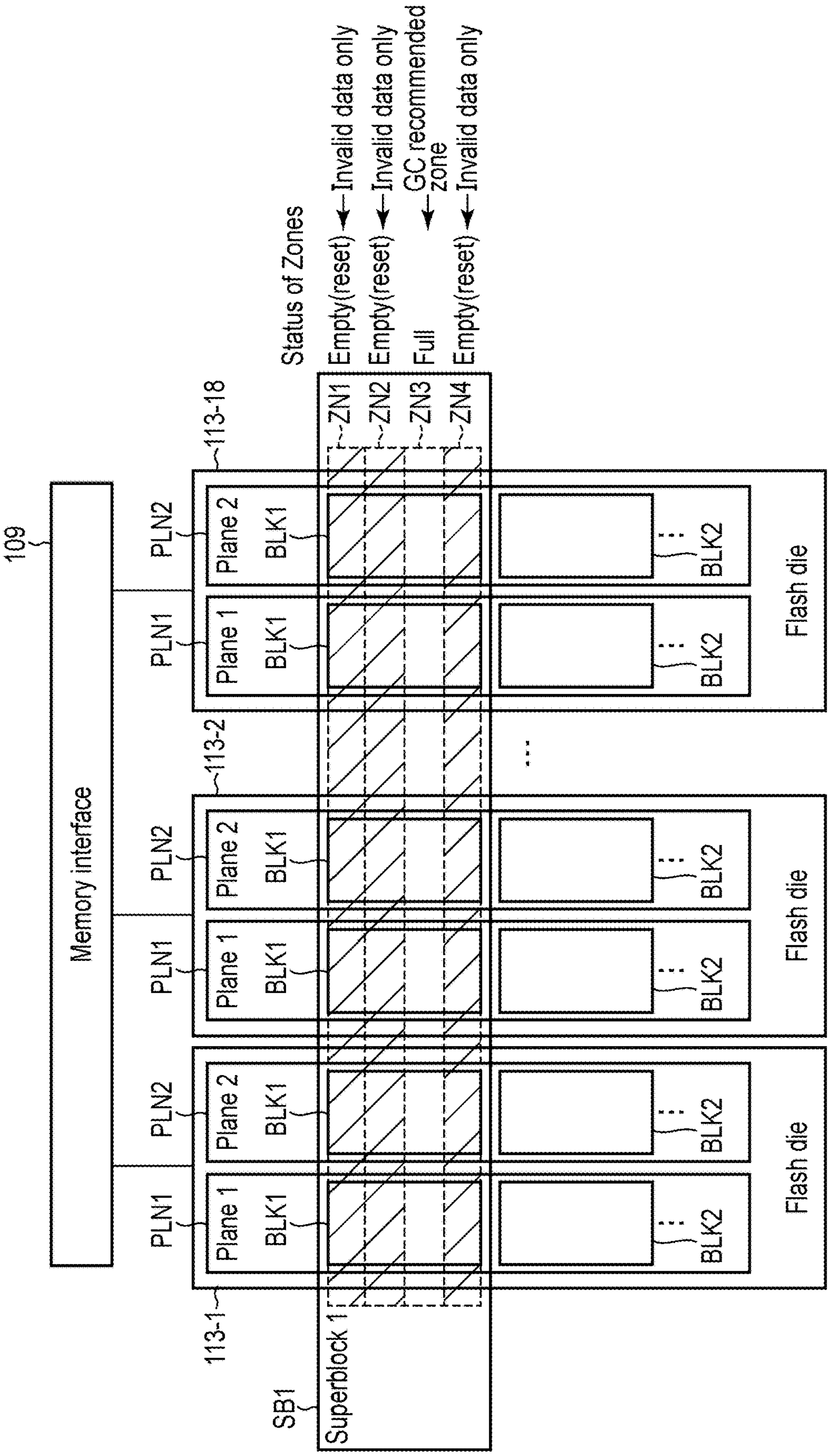
FIG. 10 is a block diagram illustrating an example of a garbage collection recommended zone in the memory system according to the embodiment.

Next is a description of zones which is to be garbage collected. FIG. 10 is a block diagram illustrating an example of a garbage collection recommended zone in the memory system 105 according to the embodiment. FIG. 10 illustrates a correspondence between a superblock SB1 similar to that shown in FIG. 9 and four zones ZN1 to ZN4.

Among the four zones included in the superblock SB1, only the zone ZN3 has the status of full. The full zone is a zone in which data write is completed for the entire zone and which includes at least valid data. That is, the storage area corresponding to the zone ZN3 stores valid data.

Of the four zones included in the superblock SB1, zones ZN1, ZN2 and ZN4 are empty zones. The empty zones are zones each of which is reset based on the zone reset command received from the host device 102. The host device 102 transmits to the memory system 105 a zone reset command specifying a zone that does not contain valid data but stores invalid data only. That is, the zones ZN1, ZN2 and ZN4, which are empty zones, store invalid data only.

In a case where all of the zones included in a superblock are empty, the controller 106 of the memory system 105 can perform the data erase operation for the superblock. When the controller 106 performs the data erase operation for a certain superblock, the controller 106 releases the correspondence between this superblock and each zone belonging to this superblock. The superblock for which the data erase operation is performed becomes a superblock to which new data can be written again. That is, the memory system 105 can newly allocate a zone to the superblock.

In FIG. 10, among the zones included in the superblock SB1, the zones other than the zone ZN3 are empty zones. Thus, the memory system 105 cannot perform the data erase operation for the superblock SB1 until the zone ZN3 becomes empty. In other words, if the zone ZN3 transitions to empty, the memory system 105 can perform the data erase operation for the superblock SB1 and can use the superblock SB1 for writing new data.

The controller 106 stores information indicating the zone ZN3 in the GC recommended zone list. That is, the controller 106 selects the zone ZN3 as a zone which is to be garbage collected in consideration of a correspondence between the storage areas of the nonvolatile memory 112 and the zones and the status of each of the zones. Then, the controller 106 stores the selected zone ZN3 in the GC recommended zone list.

Upon receiving a GC recommended zone acquisition command, the memory system 105 can provide the host device 102 with the GC recommended zone list such that the zone ZN3 is select preferentially as a Victim zone. Thus, based on an instruction from the host device 102, the memory system 105 can perform garbage collection in consideration of a data erase unit in the memory system 105. This garbage collection is more efficient than the conventional host-centered garbage collection in that the recovered storage capacity becomes larger with respect to the size of data to be moved (cost-benefit).

Figures 11, 12:
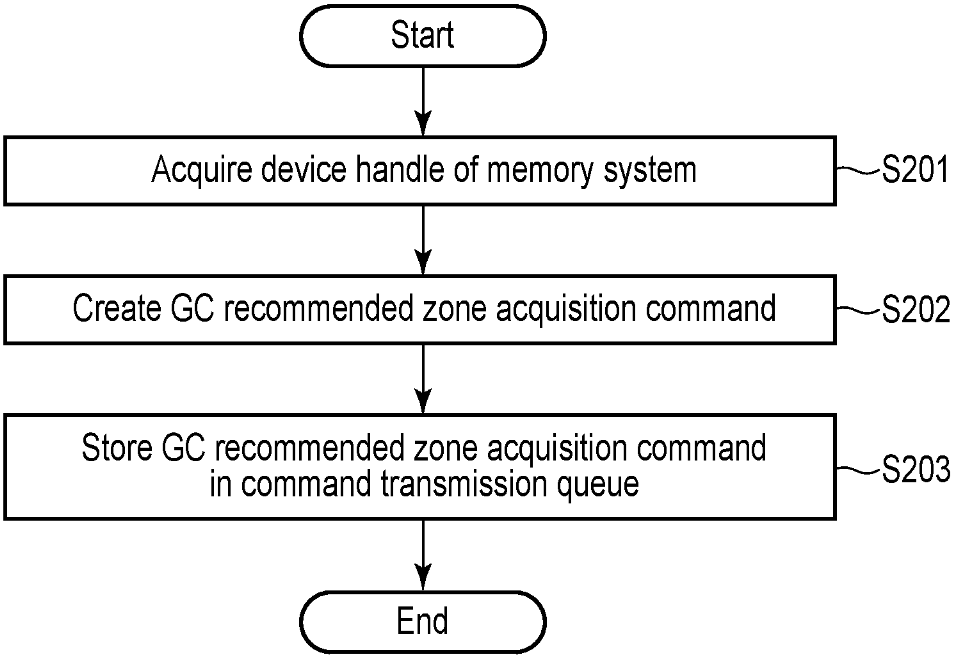
FIG. 11 is a diagram illustrating an example of a configuration of a zone status management table used in the memory system according to the embodiment.
FIG. 12 is a flowchart illustrating a procedure of a garbage collection recommended zone acquisition command transmission process which is performed in the host device according to the embodiment.

Next is a description of a zone status management table. FIG. 11 is a diagram illustrating an example of a configuration of a zone status management table used in the memory system 105 according to the embodiment. The zone status management table is a table that stores a correspondence between zones and superblocks and the status of each of the zones.

In the example of FIG. 11, the zone status management table is a table that manages empty or full zones. The zone status management table stores information that identifies a zone, information that identifies a superblock to which the zone belongs, and information indicating the status of the zone.

When a certain zone becomes full by completion of writing of data to the zone, the controller 106 of the memory system 105 adds an entry related to the zone to the zone status management table. When the controller 106 resets a certain zone in response to a zone reset command from the host device 102, the controller 106 updates the zone status management table so that the status of the zone becomes empty. When the controller 106 performs the data erase operation for a certain superblock, the controller 106 releases all entries that stores information on zones belonging to this superblock.

In the zone status management table shown in FIG. 11, information on zones ZN1, ZN2, ZN3, ZN4, ZN5 and ZN6 is managed.

The first entry of the zone status management table stores information on the zone ZN1. The zone ZN1 corresponds to a storage area included in the superblock SB1. The zone ZN1 is empty. That is, the zone ZN1 is a zone which stores invalid data only and which has already been reset.

The second entry of the zone status management table stores information on the zone ZN2. The zone ZN2 corresponds to a storage area included in the superblock SB1. The zone ZN2 is empty. That is, the zone ZN2 is a zone which stores invalid data only and which has already been reset.

The third entry of the zone status management table stores information on the zone ZN3. The zone ZN3 corresponds to a storage area included in the superblock SB1. The zone ZN3 is full. That is, the zone ZN3 is a zone to which data is completely written and which stores at least valid data.

The fourth entry of the zone status management table stores information on the zone ZN4. The zone ZN4 corresponds to a storage area included in the superblock SB1. The zone ZN4 is empty. That is, the zone ZN4 is a zone which stores invalid data only and which has already been reset.

The fifth entry of the zone status management table stores information on the zone ZN5. The zone ZN5 corresponds to a storage area included in the superblock SB2. The zone ZN5 is full. That is, the zone ZN5 is a zone to which data is completely written and which stores at least valid data.

The sixth entry of the zone status management table stores information on the zone ZN6. The zone ZN6 corresponds to a storage area included in the superblock SB2. The zone ZN6 is full. That is, the zone ZN6 is a zone to which data is completely written and which stress at least valid data.

The GC recommended zone acquisition unit 209 creates a GC recommended zone list based on the zone status management table. For example, the GC recommended zone acquisition unit 209 selects a superblock configured only by full zones and empty zones. When the ratio of the full zones in the selected superblock is lower than a threshold value, all of the full zones included in the selected superblock are added to the GC recommended zone list. The threshold value may be a predetermined value or a value determined based on the number of blocks (the number of free blocks) in the memory system 105 to which data can newly be written. Alternatively, the GC recommended zone acquisition unit 209 may select a particular number of superblocks having a low ratio of full zones among the superblocks configured only by full zones and empty zones, and add all of the full zones included in the selected particular number of superblocks to the GC recommended zone list.

Referring to the zone status management table shown in FIG. 11, the controller 106 stores, for example, information indicating the zone ZN3 in the GC recommended zone list. Upon receiving the GC recommended zone acquisition command from the host device 102, the controller 106 provides the host device 102 with information indicating the zone ZN3. Then, the host device 102 performs a garbage collection process so that all data stored in the zone ZN3 is invalidated, and transmits a zone reset command specifying the zone ZN3 to the controller 106. Thus, the controller 106 resets the zone ZN3 to cause the zone ZN3 to transition to empty in the zone status management table.

When all the zones included in the superblock SB1 become empty, the controller 106 can perform the data erase operation for the superblock SB1. Then, the controller 106 releases entries corresponding to the zones included in the superblock SB1 in the zone status management table.

Next, a garbage collection (GC) recommended zone acquisition command transmission process will be described. FIG. 12 is a flowchart illustrating a procedure of a GC recommended zone acquisition command transmission process which is performed in the host device 102 according to the embodiment. The host device 102 starts a GC recommended zone acquisition command transmission process when the GC processing unit 205 starts garbage collection.

The host controller 103 of the host device 102 acquires a device handle of the memory system 105 (S201). Thus, the host controller 103 can access the memory system 105.

The host controller 103 creates a GC recommended zone acquisition command (S202).

The host controller 103 stores (or enqueues) the GC recommended zone acquisition command created in S202 in the command transmission queue 301 of the host memory 104 (S203).

Therefore, the GC recommended zone acquisition command can be transmitted from the host device 102 to the memory system 105.

Figure 13:
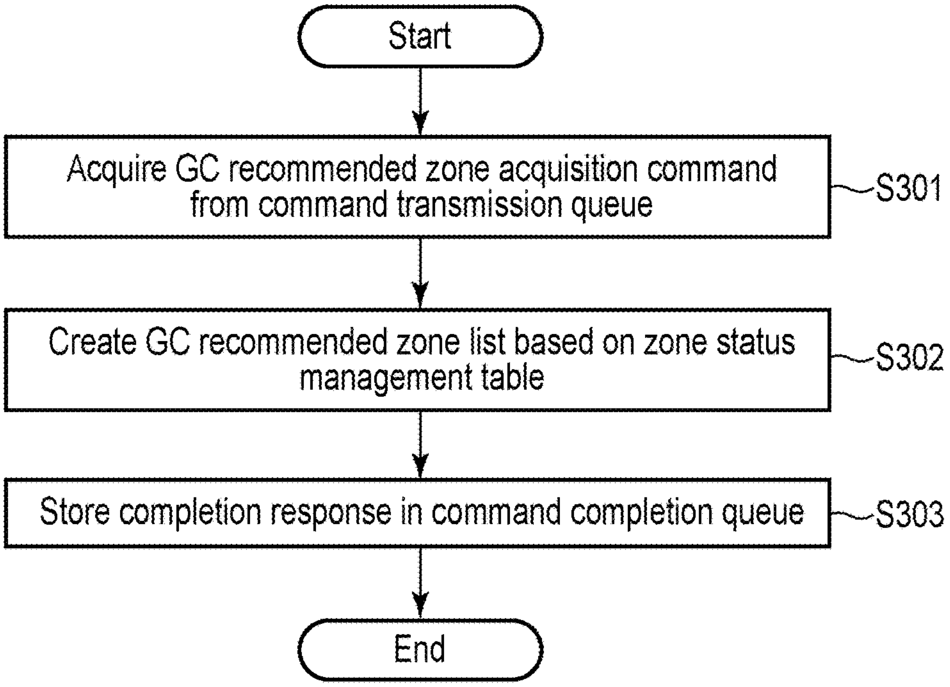
FIG. 13 is a flowchart illustrating a procedure of a garbage collection recommended zone list transmission process which is performed in the memory system according to the embodiment.

Next, the garbage collection (GC) recommended zone list transmission process will be described. FIG. 13 is a flowchart illustrating a procedure of a GC recommended zone list transmission process which is performed in the memory system 105 according to the embodiment. When a GC recommended zone acquisition command is stored in the command transmission queue 301, the memory system 105 starts a GC recommended zone list transmission process.

First, the controller 106 of the memory system 105 acquires the GC recommended zone acquisition command from the command transmission queue 301 of the host memory 104 (S301).

Upon receiving the GC recommended zone acquisition command in S301, the controller 106 creates a GC recommended zone list based on the zone status management table (S302). Instead of creating the GC recommended zone list, the controller 106 may read a GC recommended zone list, which is created in advance and then stored in the buffer memory 111, from the buffer memory 111 to acquire the GC recommended zone list.

The controller 106 stores a completion response, which corresponds to the GC recommended zone acquisition command received in S301, in the command completion queue 302 of the host memory 104 (S303). The completion response stored in the command completion queue 302 includes information indicating that a process of acquiring the GC recommended zone list created in S302 has been normally performed.

Figure 14:
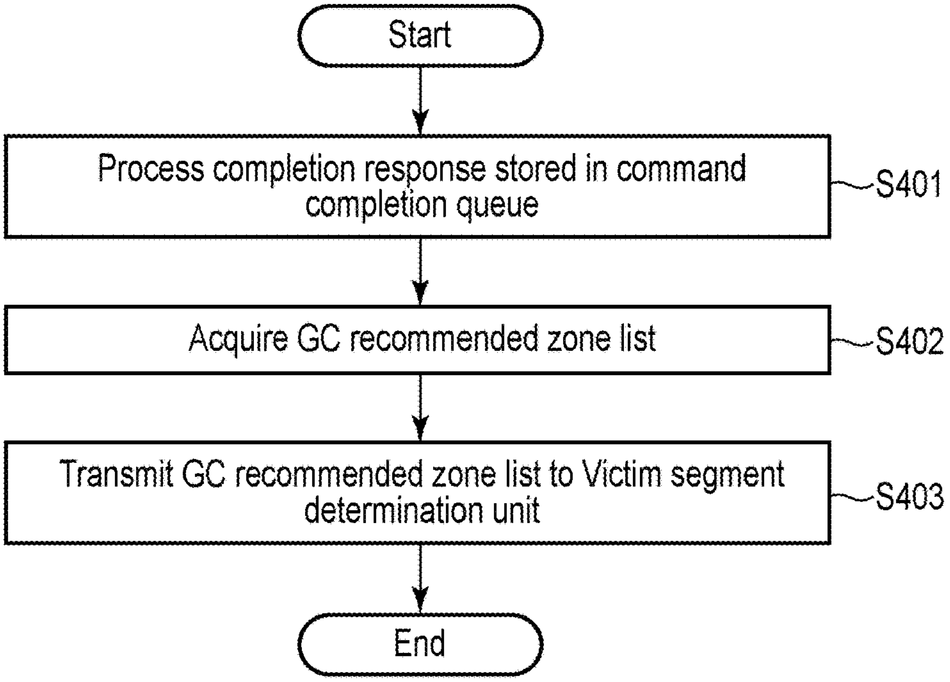
FIG. 14 is a flowchart illustrating a procedure of a garbage collection recommended zone list reception process which is performed in the host device according to the embodiment.

Next, the garbage collection (GC) recommended zone list reception process will be described. FIG. 14 is a flowchart illustrating a procedure of the GC recommended zone list reception process which is performed in the host device 102 according to the embodiment. The host device 102 starts the GC recommended zone list reception process when a completion response corresponding to the GC recommended zone acquisition command is stored in the command completion queue 302.

The host controller 103 processes the completion response corresponding to the GC recommended zone acquisition command stored in the command completion queue in S303 of FIG. 13 (S401).

When the host controller 103 processes the completion response in S401, the host controller 103 acquires the GC recommended zone list from the memory system 105 (S402). For example, the host controller 103 acquires the GC recommended zone list from the data buffer area 303 of the host memory 104.

The host controller 103 transmits the GC recommended zone list acquired in S402 to the Victim segment determination unit 206 (403).

Thus, when determining data to be moved by the garbage collection, the Victim segment determination unit 206 can refer to information indicating a zone which is to be garbage collected, which is provided from the memory system 105.

Figure 15:
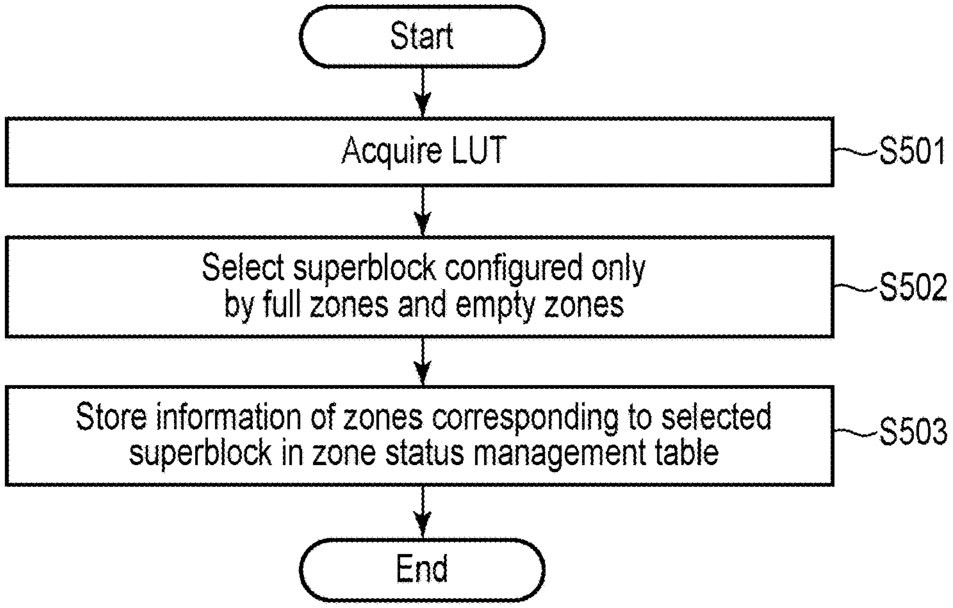
FIG. 15 is a flowchart illustrating a procedure of a zone status management table construction process which is performed in the memory system according to the embodiment.

Next, a zone status management table construction process will be described. FIG. 15 is a procedure of a zone status management table construction process which is performed in the memory system 105 according to the embodiment. The memory system 105 starts the zone status management table construction process when the memory system 105 is started up, for example.

First, the controller 106 of the memory system 105 acquires the lookup table (LUT) from the nonvolatile memory 112 or the buffer memory 111 (S501). Referring to the LUT, the controller 106 can recognize the status of each zone in the memory system 105.

Referring to the LUT acquired in S501, the controller 106 selects a superblock configured only by full zones and empty zones (S502).

The controller 106 stores information of zones corresponding to the superblock selected in S502 in the zone status management table (S503).

Thus, the controller 106 can construct a zone status management table based on the start-up condition of the memory system 105. In addition, the controller 106 may store the zone status management table in the nonvolatile memory 112 when the power of the memory system 105 is shut down, and then reconstruct the zone status management table by reading the zone status management table from the nonvolatile memory 112 when the memory system 105 is restarted.

Figure 16:
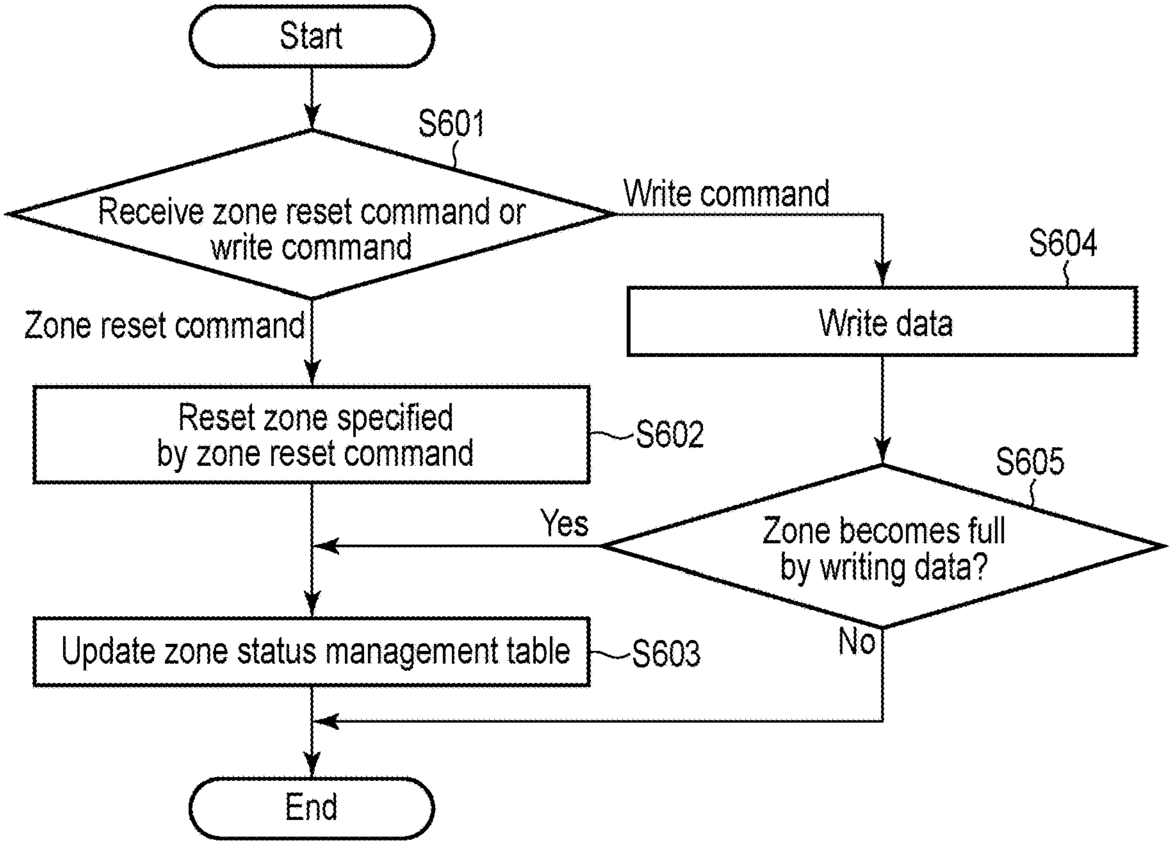
FIG. 16 is a flowchart illustrating a procedure of a zone status management table updating process which is performed in the memory system according to the embodiment.

Next, a zone status management table update process will be described. FIG. 16 is a flowchart illustrating a procedure of a zone status management table updating process which is performed in the memory system 105 according to the embodiment.

The controller 106 determines whether a command received from the host device 102 is a zone reset command or a write command (S601).

When the received command is the zone reset command (zone reset command in S601), the controller 106 resets a zone specified by the zone reset command (S602). Then, the controller 106 causes the zone specified by the zone reset command to transition to empty.

The controller 106 updates the zone status management table to indicate that the zone reset in S602 is empty (S603).

When the received command is the write command (write command in S601), the controller 106 writes data to a zone (write destination zone) specified by the write command (S604).

The controller 106 determines whether the write destination zone becomes full by writing data in S604 (S605).

When the zone does not become full by writing data in S604 (No in S605), the controller 106 terminates the zone status management table update process.

When the zone becomes full by writing data in S604 (Yes in S605), the controller 106 updates the zone status management table to indicate that the zone to which data is written in S604 is full (S603).

In this manner, the controller 106 can update the zone status management table in response to the transition of any of the zones managed in the memory system 105 to full or empty.

When, further, a superblock configured only by empty zones is generated by the transition of any of the zones to empty, the controller 106 can perform the data erase operation for the superblock. Then, the controller 106 releases an entry among the plurality of entries in the zone status management table, which stores information of a zones belonging to the superblock for which the data erase operation can be performed.

Furthermore, when reading the GC recommended zone list from the buffer memory 111 in response to a GC recommended zone acquisition command, the controller 106 may update the GC recommended zone list in response to the update of the zone status management table. Thus, even though the controller 106 provides the host device 102 with the GC recommended zone list prepared in advance, the controller 106 can provide the host device 102 with a zone which is to be garbage collected, which is adapted to the latest status of the zones.

Figure 17:
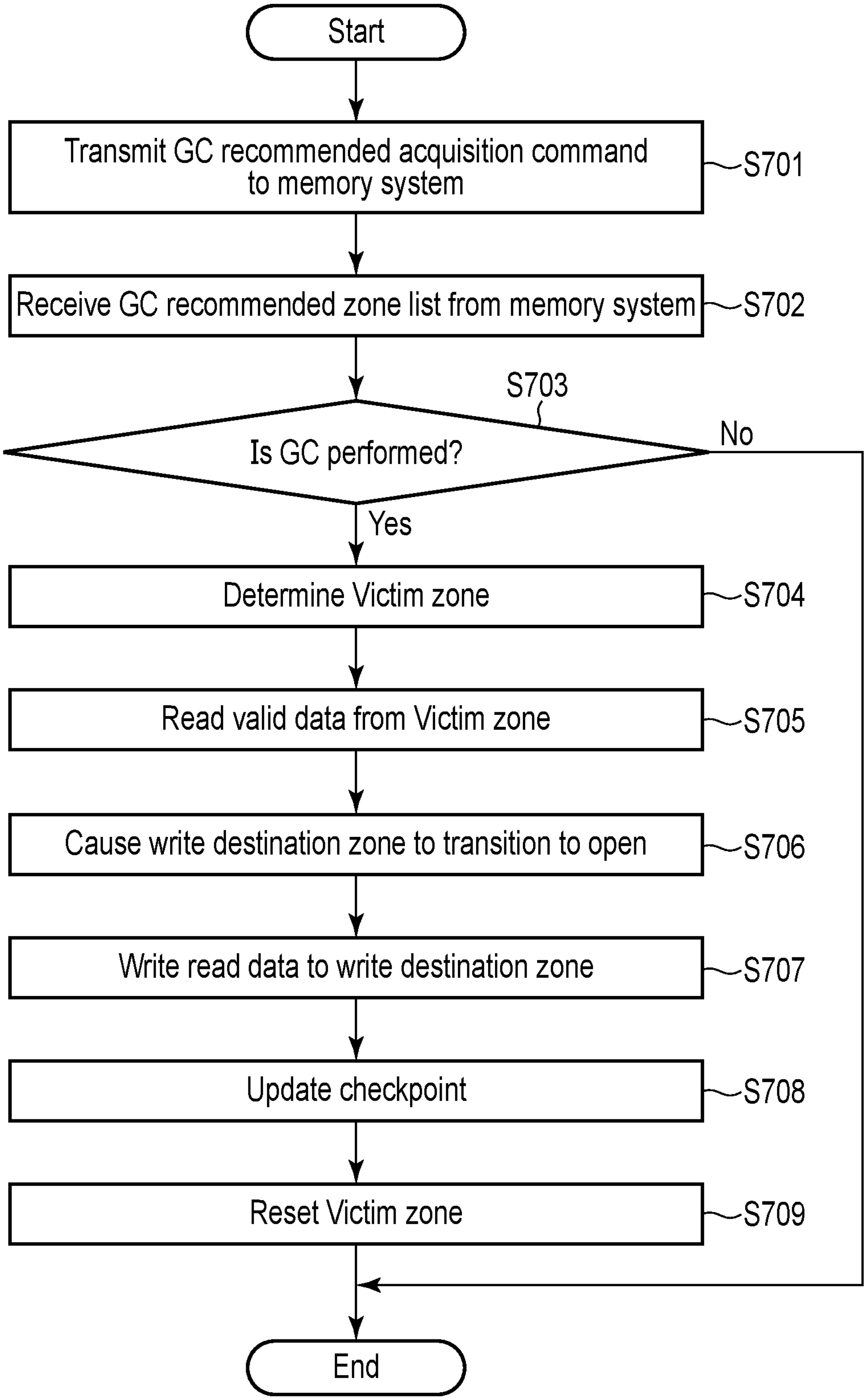
FIG. 17 is a flowchart illustrating a procedure of a garbage collection which is performed in the host device according to the embodiment.

Next, a procedure of garbage collection will be described. FIG. 17 is a flowchart illustrating a procedure of garbage collection which is performed in the host device 102 according to the embodiment. The host controller 103 of the host device 102 starts garbage collection, for example, when there is no access from the host device 102 to the memory system 105 for a certain period of time or longer and a particular amount of data has been written since the last garbage collection.

The host controller 103 transmits a GC recommended zone acquisition command to the memory system 105 (S701).

The host controller 103 receives a GC recommended zone list from the memory system 105 (S702).

The host controller 103 determines whether or not to perform garbage collection (S703). In this case, the host controller 103 refers to the GC recommended zone list received in S702 and the metadata to determine whether or not to perform garbage collection.

When garbage collection is not performed (No in S703), the host controller 103 terminates the garbage collection. For example, the host controller 103 determines that the garbage collection is not performed if fragmentation does not occur much in the zones as viewed from the host device 102.

When garbage collection is performed (Yes in S703), the host controller 103 determines a Victim zone (S704). In this case, the host controller 103 determines the Victim zone using the GC recommended zone list received in S702.

The host controller 103 transmits to the memory system 105 a read command specifying valid data of the Victim zone determined in S704. Thus, the host controller 103 reads the valid data from the Victim zone (S705).

The host controller 103 causes a write destination zone to transition to open (S706). The zone caused to transition to open is brought into a data writable state. If the write destination zone is already open, the host controller 103 skips the procedure of S706.

The host controller 103 designates the zone caused to transition to open in S706 as a write destination, and transmits to the memory system 105 a write command to write the data read in S705. Thus, the host controller 103 writes the data read in S705 to the zone caused to transition to open in S706 (S707).

The host controller 103 updates a checkpoint in response to the completion of writing in S707 (S708). The host controller 103 updates the metadata 509 in response to the completion of data write in S707. The host controller 103 updates the checkpoint 508 so as to store the updated metadata 509.

The host controller 103 resets the Victim zone determined in S704 (S709). In response to the fact that the Victim zone becomes a zone that stores invalid data only as a result of completion of the data write in S707, the host controller 103 transmits to the memory system 105 a zone reset command specifying the Victim zone. Upon receiving the zone reset command, the controller 106 of the memory system 105 resets the Victim zone to cause the Victim zone to transition to empty.

Thus, the host device 102 can perform garbage collection based on a zone which is to be garbage collected provided from the memory system 105.

As described above, when the controller 106 of the memory system 105 according to the embodiment receives a GC recommended zone acquisition command from the host device 102, the controller 106 transmits a GC recommended zone list to the host device 102. The GC recommended zone list stores information indicating a zone which is to be garbage collected, which is determined based on the zone status management table. That is, the controller 106 selects a zone which is to be garbage collected in consideration of the correspondence between the storage areas of the nonvolatile memory 112 and the zones, and the status of each of the zones.

Based on the received GC recommended zone list, the host controller 103 of the host device 102 determines valid data to be moved in the garbage collection process. Then, the host controller 103 transmits a read command and write command, or a copy command, which specify the determined valid data to the memory system 105.

Thus, in the information processing system 101 according to the present embodiment, the host device 102 can perform garbage collection in consideration of the correspondence between the zones and superblocks, which is managed only by the memory system 105.

The host device 102 can manage the WAF of the memory system 105 because the GC is completed only by the garbage collection which is performed by the host device 102. Factors other than garbage collection which increase the WAF of the memory system 105 include, for example, updating of the LUT, a decrease in the size of data writable to a superblock due to a plane failure or the like, and addition of an error correction code to write data. However, each of the factors causes only writing of data of a size smaller than the write size of user data. Therefore, for example, the host device 102 can maintain the WAF of the memory system 105 at approximately 1.

Further, in the memory system 105, garbage collection can be prevented from being caused at timing unintended by the host device 102. That is, the QOS of the memory system 105 can be improved because there is no conflict between I/O access of the host device 102 and garbage collection to be performed by the memory system 105.

Furthermore, the memory system 105 can perform garbage collection in consideration of a data erase unit in the memory system 105 because the memory system 105 can provide the host device 102 with the GC recommended zone list. Thus, the memory system 105 can resolve a problem caused when the size of a zone is smaller than the data erase unit. The memory system 105 can perform efficient garbage collection such that the capacity of a storage to be recovered becomes larger with respect to the size of data to be moved, as compared with the conventional host-centered garbage collection.

The nonvolatile memory 112 of the memory system 105 has been so far described as a semiconductor memory device. However, the nonvolatile memory 112 may be a magnetic disk included in a hard disk drive (HDD).

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system connectable to a host device, comprising:

a nonvolatile memory including a plurality of physical blocks; and a controller configured to control access including writing and reading of data to and from the nonvolatile memory, based on a command received from the host device, wherein the controller is configured to:

manage a plurality of zones using first information indicating (i) a correspondence between the plurality of zones and a plurality of storage areas of the nonvolatile memory and (ii) a status of each of the plurality of zones, each of the plurality of zones corresponding to a logical address range within a logical address space that is used in an access from the host device to the memory system, the status of one of the plurality of zones including at least a first status and a second status, the first status indicating that data is written over an entire logical address range corresponding to the one of the plurality of zones, the second status indicating that the one of the plurality of zones is reset;

manage a plurality of logical blocks each including physical blocks among the plurality of physical blocks, each of the plurality of logical blocks including at least two storage areas among the plurality of storage areas, the at least two storage areas corresponding to at least two zones, respectively; and in response to receiving a first command from the host device, the first command requesting a zone which is to be garbage collected, transmit to the host device a first list including information indicating the zone which is to be garbage collected, the zone which is to be garbage collected being determined based on the first information, wherein the first list includes, as the information indicating the zone which is to be garbage collected, information indicating one or more zones of the first status which is included in a first logical block, the first logical block being a logical block in which a ratio of the zones of the first status is lower than a first threshold, among logical blocks composed of only zones of the first status and zones of the second status.

2. The memory system of claim 1, further comprising a volatile memory configured to store the first list, wherein the controller is further configured to:

in response to receiving the first command from the host device, read the first list from the volatile memory; and transmit the read first list to the host device.

3. The memory system of claim 2, wherein:

the controller is further configured to:

when data is written over the entire logical address range corresponding to a first zone among the plurality of zones, update the first information to indicate that the first zone is the first status;

when the first zone is reset based on a second command received from the host device, update the first information to indicate that the first zone is the second status; and in response to that the first information is updated, update the first list in the volatile memory based on the first information which is updated.

4. The memory system of claim 1, wherein each of the at least two storage areas extends over the physical blocks included in each of the plurality of logical blocks.

5. The memory system of claim 4, wherein the first information includes, as the correspondence between the plurality of zones and the plurality of storage areas, information indicating which of the plurality of logical blocks each of the plurality of zone is included in.

6. The memory system of claim 1, wherein the controller is further configured to write valid data included in the zone which is to be garbage collected whose information is included in the first list, to another zone, based on a second command received from the host device, after transmitting the first list to the host device.

7. The memory system of claim 1, wherein the controller is further configured to:

when the memory system is started up, read from the nonvolatile memory second information indicating a correspondence between logical addresses in the logical address space and the plurality of storage areas; and construct the first information with reference to the second information.

8. The memory system of claim 1, wherein the nonvolatile memory includes a NAND flash memory.

9. A host device connectable to a memory system, comprising:

an interface circuit configured to be connected to the memory system; and a processor configured to transmit a command to the memory system via the interface circuit, the command requesting access to the memory system, the access including writing of data and reading of data for the memory system, wherein the processor is configured to:

manage a plurality of zones, each of the plurality of zones corresponding to one of a plurality of logical address ranges within a logical address space and one of a plurality of storage areas provided in the memory system, the logical address space being used for the access to the memory system;

transmit to the memory system a first command for requesting a zone which is to be garbage collected among the plurality of zones;

receive a first list from the memory system as a response for the first command, the first list including information indicating one or more zones which is to be garbage collected, the one or more zones which is to be garbage collected are determined based on (i) a correspondence between the plurality of zones and the plurality of storage areas and (ii) a status of each of the plurality of zones, the status of one of the plurality of zones including at least a first status and a second status, the first status indicating that data is written over an entire logical address range corresponding to the one of the plurality of zones, the second status indicating that the one of the plurality of zones is reset;

transmit to the memory system a second command for instructing the memory system to rewrite at least valid data among data of the one or more zones which are to be garbage collected and which are included in the first list, to another zone;

receive a response for the second command from the memory system; and transmit to the memory system a third command for instructing the memory system to reset the one or more zones which are to be garbage collected, after the one or more zones which are to be garbage collected become a state in which the valid data is not stored.

10. The host device of claim 9, wherein the plurality of storage areas is included in a nonvolatile memory of the memory system, the nonvolatile memory includes a NAND flash memory.

11. A method of controlling a memory system connectable to a host device, the memory system including a nonvolatile memory, the nonvolatile memory including a plurality of physical blocks, the method comprising:

managing a plurality of zones using first information indicating (i) a correspondence between the plurality of zones and a plurality of storage areas of the nonvolatile memory and (ii) a status of each of the plurality of zones, each of the plurality of zones corresponding to a logical address range within a logical address space that is used in an access from the host device to the memory system, the status of one of the plurality of zones including at least a first status and a second status, the first status indicating that data is written over an entire logical address range corresponding to the one of the plurality of zones, the second status indicating that the one of the plurality of zones is reset;

managing a plurality of logical blocks each including physical blocks among the plurality of physical blocks, each of the plurality of logical blocks including at least two storage areas among the plurality of storage areas, the at least two storage areas corresponding to at least two zones, respectively; and in response to receiving a first command from the host device, the first command requesting a zone which is to be garbage collected, transmitting to the host device a first list including information indicating the zone which is to be garbage collected, the zone which is to be garbage collected being determined based on the first information, wherein the first list includes, as the information indicating the zone which is to be garbage collected, information indicating one or more zones of the first status which is included in a first logical block, the first logical block being a logical block in which a ratio of the zones of the first status is lower than a first threshold, among logical blocks composed of only zones of the first status and zones of the second status.

12. The method of claim 11, wherein the first list is stored in a volatile memory of the memory system, the transmitting the first list to the host device includes:

in response to receiving the first command from the host device, reading the first list from the volatile memory; and transmitting the read first list to the host device.

13. The method of claim 12, further comprising:

determining that data is written over the entire logical address range corresponding to a first zone among the plurality of zones;

in response to determining that the data is written over the entire logical address range corresponding to the first zone, updating the first information to indicate that the first zone is the first status;

determining that the first zone is reset based on a second command received from the host device;

in response to determining that the first zone is reset based on the second command, updating the first information to indicate that the first zone is the second status; and in response to updating the first information, updating the first list in the volatile memory based on the first information which is updated.

14. The method of claim 11, wherein each of the at least two storage areas extends over the physical blocks included in each of the plurality of logical blocks.

15. The method of claim 14, wherein the first information includes, as the correspondence between the plurality of zones and the plurality of storage areas, information indicating which of the plurality of logical blocks each of the plurality of zone is included in.

16. The method of claim 11, further comprising:

writing valid data included in the zone which is to be garbage collected whose information is included in the first list, to another zone, based on a second command received from the host device, after transmitting the first list to the host device.

17. The method of claim 11, further comprising:

when the memory system is started up, reading from the nonvolatile memory second information indicating a correspondence between logical addresses in the logical address space and the plurality of storage areas; and constructing the first information with reference to the second information.

18. The method of claim 11, wherein the nonvolatile memory is a NAND flash memory.

* * * * *